(12) United States Patent
Pender

(10) Patent No.: US 9,491,170 B2
(45) Date of Patent: *Nov. 8, 2016

(54) AUTHENTICATING CUSTOMERS AND MANAGING AUTHENTICATED SESSIONS

(71) Applicant: Bank of America Corporation, Charlotte, NC (US)

(72) Inventor: Mark A. Pender, Rockville Center, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,399

(22) Filed: Jan. 15, 2015

(65) Prior Publication Data

US 2016/0212125 A1 Jul. 21, 2016

(51) Int. Cl.
*G06F 7/04* (2006.01)
*H04L 29/06* (2006.01)
*G06Q 40/02* (2012.01)

(52) U.S. Cl.
CPC ........... *H04L 63/0861* (2013.01); *G06Q 40/02* (2013.01); *H04L 63/12* (2013.01)

(58) Field of Classification Search
CPC . G06Q 20/40145; G06F 21/32; G06F 21/31; H04W 12/06
USPC .............................. 726/7; 713/186; 380/270
See application file for complete search history.

(56) References Cited

U.S. PATENT DOCUMENTS

| 8,327,141 | B2 | 12/2012 | Vysogorets et al. | |
|---|---|---|---|---|
| 8,566,203 | B1 | 10/2013 | Vieira et al. | |
| 8,671,444 | B2 | 3/2014 | Kulkarni et al. | |
| 2008/0148052 | A1 | 6/2008 | Lindsley | |
| 2009/0037339 | A1* | 2/2009 | Ancell | G06Q 20/04 705/72 |
| 2009/0037982 | A1* | 2/2009 | Wentker | G06F 21/33 726/3 |
| 2009/0281887 | A1* | 11/2009 | Deakin | G06Q 30/0222 705/14.23 |
| 2011/0131128 | A1* | 6/2011 | Vaananen | G06Q 20/10 705/37 |
| 2011/0246317 | A1* | 10/2011 | Coppinger | G06Q 20/10 705/17 |
| 2011/0251892 | A1* | 10/2011 | Laracey | G06Q 30/0253 705/14.51 |
| 2012/0160912 | A1* | 6/2012 | Laracey | G06Q 20/1085 235/379 |

(Continued)

OTHER PUBLICATIONS

May 9, 2016 (US) Non-Final Office Action—U.S. Appl. No. 14/597,424.

*Primary Examiner* — Kambiz Zand
*Assistant Examiner* — Tongoc Tran
(74) *Attorney, Agent, or Firm* — Banner & Witcoff, Ltd.; Michael A. Springs

(57) ABSTRACT

Methods, systems, and computer-readable media for authenticating customers of an organization and managing authenticated sessions of various customers are presented. Some aspects of the disclosure provide ways for a customer of an organization to authenticate using a mobile computing device, such as the customer's personal mobile device, when interacting with the organization in various contexts, such as when accessing an automated transaction device or when interacting with an agent of the organization during an in-person session or during a teleconference session. In some arrangements, the customer's authentication status, which may be established on the mobile computing device and which, in some instances, may be verified based on the location of the mobile computing device, may be carried over from the mobile computing device to another computing device or system, such as an automated transaction device or a teller terminal device, which may be used by an agent of the organization.

21 Claims, 30 Drawing Sheets

(56) References Cited

U.S. PATENT DOCUMENTS

| | | | |
|---|---|---|---|
| 2012/0185386 A1 | 7/2012 | Salama et al. | |
| 2012/0265809 A1* | 10/2012 | Hanson | H04L 67/141 709/204 |
| 2013/0171958 A1 | 7/2013 | Goodson et al. | |
| 2013/0212017 A1* | 8/2013 | Bangia | G06Q 20/20 705/44 |
| 2014/0006281 A1* | 1/2014 | Leber | G06Q 20/40 705/44 |
| 2014/0235261 A1 | 8/2014 | Fan et al. | |
| 2014/0250512 A1 | 9/2014 | Goldstone et al. | |
| 2014/0257932 A1 | 9/2014 | Joa et al. | |
| 2014/0257933 A1 | 9/2014 | Joa et al. | |
| 2014/0259190 A1 | 9/2014 | Kiang et al. | |
| 2014/0263648 A1 | 9/2014 | Van Bosch et al. | |
| 2014/0279072 A1* | 9/2014 | Joseph | G09F 9/30 705/14.73 |
| 2014/0279276 A1 | 9/2014 | Tolcher | |
| 2014/0279458 A1 | 9/2014 | Holman et al. | |
| 2014/0279483 A1 | 9/2014 | Bridges et al. | |
| 2014/0279497 A1 | 9/2014 | Qaim-Maqami et al. | |
| 2014/0279498 A1 | 9/2014 | Qaim-Maqami et al. | |
| 2014/0279506 A1 | 9/2014 | Bridges et al. | |
| 2014/0279688 A1 | 9/2014 | Ginsberg et al. | |
| 2014/0282877 A1 | 9/2014 | Mahaffey et al. | |
| 2014/0283005 A1 | 9/2014 | Avni et al. | |
| 2014/0283018 A1 | 9/2014 | Dadu et al. | |
| 2014/0289116 A1 | 9/2014 | Polivanyi | |
| 2014/0297438 A1 | 10/2014 | Dua | |
| 2014/0298433 A1 | 10/2014 | McLaughlin et al. | |
| 2014/0310171 A1 | 10/2014 | Grossman et al. | |
| 2014/0310172 A1 | 10/2014 | Grossman et al. | |
| 2014/0315517 A1 | 10/2014 | Cohan | |
| 2014/0325019 A1 | 10/2014 | Austin et al. | |
| 2014/0333414 A1 | 11/2014 | Kursun | |
| 2014/0337221 A1 | 11/2014 | Hoyos | |
| 2014/0344149 A1 | 11/2014 | Campos | |
| 2014/0358799 A1 | 12/2014 | Kingston et al. | |
| 2014/0365377 A1 | 12/2014 | Salama et al. | |
| 2015/0012426 A1 | 1/2015 | Purves et al. | |
| 2015/0019441 A1 | 1/2015 | Brown et al. | |
| 2015/0058215 A1* | 2/2015 | Johnson | G06Q 20/1085 705/43 |
| 2015/0095235 A1* | 4/2015 | Dua | G06Q 20/20 705/44 |
| 2015/0120550 A1* | 4/2015 | Jung | G06Q 20/3224 705/44 |
| 2015/0163056 A1* | 6/2015 | Nix | H04L 9/0869 380/46 |
| 2015/0312762 A1* | 10/2015 | Hernandez | H04W 4/008 455/41.2 |
| 2015/0356526 A1* | 12/2015 | Christmas | G06Q 40/02 705/43 |
| 2016/0063619 A1 | 3/2016 | Smith et al. | |
| 2016/0100282 A1 | 4/2016 | Pounds et al. | |

\* cited by examiner

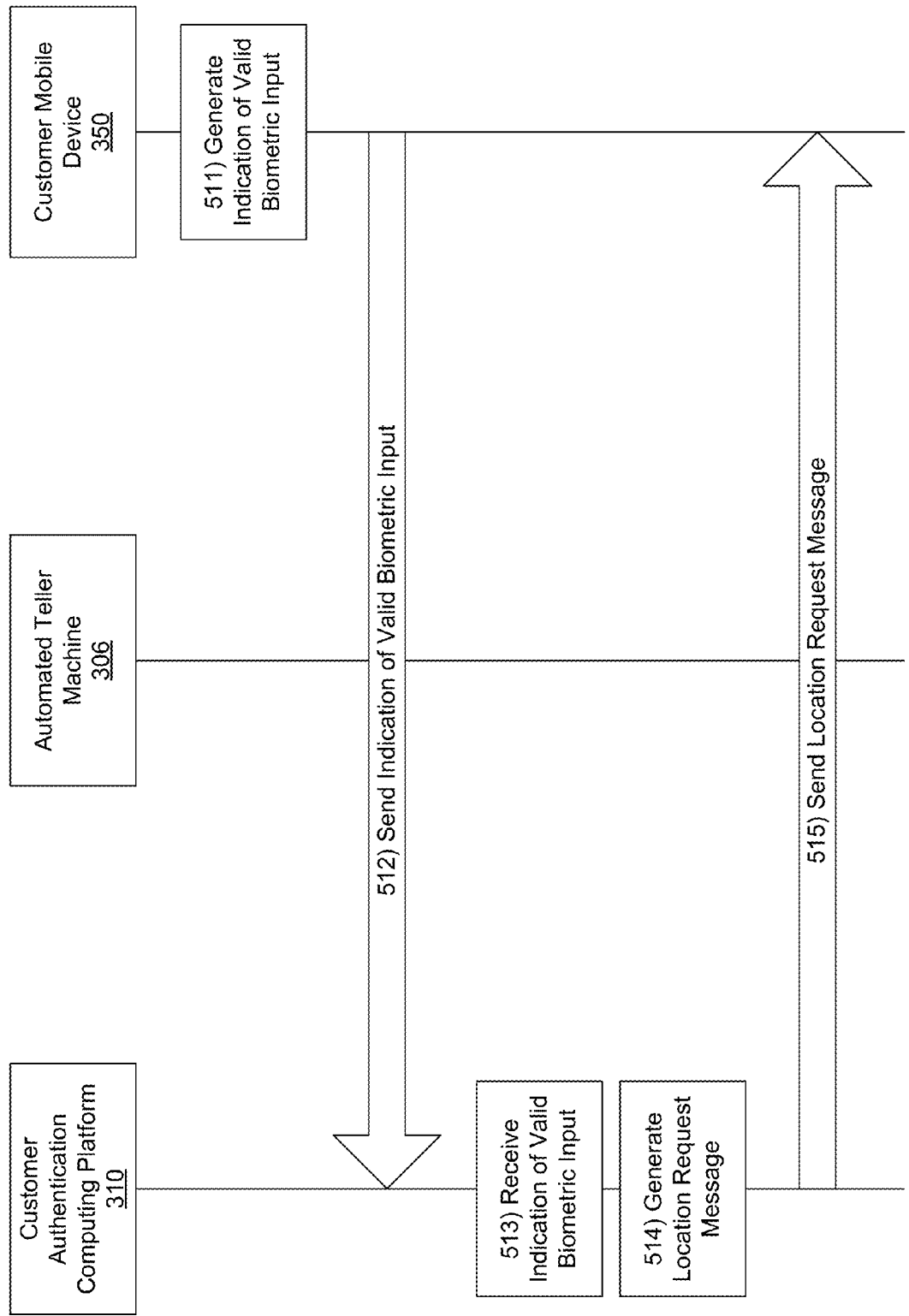

AUTHENTICATING CUSTOMERS AND MANAGING AUTHENTICATED SESSIONS

BACKGROUND

Aspects of the disclosure relate to computer hardware and software. In particular, one or more aspects of the disclosure generally relate to computer hardware and software for authenticating customers and managing authenticated sessions.

Large organizations, such as financial institutions, may serve many customers, and increasingly, customers of such organizations are using computing devices, including mobile computing devices, to interact with the organizations about the products and/or services offered by these organizations. Some large organizations may even provide specialized websites and/or customer portals for their customers that allow customers to view and/or purchase various products and/or services online, conduct transactions, and view and/or manage one or more accounts.

As customers become increasingly familiar with using computing devices to interact with organizations, and as such computing devices continue to advance and provide new functionality, customers of various organizations continue to demand greater functionality when interacting with organizations via various channels, as well as increasingly easy-to-use and convenient ways of utilizing such functionality.

SUMMARY

Aspects of the disclosure relate to various systems and techniques that provide effective, efficient, scalable, and convenient ways of facilitating interaction with an organization via various channels using computing devices, particularly in ways that provide enhanced techniques for authenticating customers of an organization and managing authenticated sessions of various customers.

For example, some aspects of the disclosure provide ways for a customer of an organization, such as a financial institution, to authenticate using a mobile computing device, such as the customer's personal mobile device, when interacting with the organization in various contexts, such as when accessing an automated transaction device or when interacting with an agent of the organization during an in-person session or during a teleconference session. In one or more arrangements, the customer's authentication status, which may be established on the mobile computing device and which, in some instances, may be verified based on the location of the mobile computing device, may be carried over from the mobile computing device to another computing device or system, such as an automated transaction device or a teller terminal device, which may be used by an agent of the organization, so as to easily and securely authenticate the customer and allow the customer to access his or her accounts. As illustrated in greater detail below, these features and/or others may provide more convenient and seamless experiences for customers of an organization when interacting with the organization in various ways.

In accordance with one or more embodiments, a customer authentication computing platform having at least one processor, a memory, and a communication interface may receive, via the communication interface, and from a mobile computing device, a request to authenticate a customer of an organization. Subsequently, the computing platform may send, via the communication interface, and to the mobile computing device, a first message configured to cause the mobile computing device to prompt the customer of the organization to provide biometric authentication input for validation by the mobile computing device. Thereafter, the computing platform may receive, via the communication interface, and from the mobile computing device, information indicating that the mobile computing device received valid biometric authentication input from the customer. In response to receiving the information indicating that the mobile computing device received the valid biometric authentication input from the customer, the computing platform may send, via the communication interface, and to the mobile computing device, a second message configured to cause the mobile computing device to provide information identifying a current location of the mobile computing device. Subsequently, the computing platform may receive, via the communication interface, and from the mobile computing device, location information identifying the current location of the mobile computing device. Next, the computing platform may validate the location information identifying the current location of the mobile computing device. If the location information is valid, the computing platform may generate a validation code that is usable to establish an authentication status of the customer. Subsequently, the computing platform may send, via the communication interface, and to the mobile computing device, the validation code. Thereafter, the computing platform may receive, via the communication interface, and from an agent terminal device, the validation code. In response to receiving the validation code, the computing platform may send, via the communication interface, and to the agent terminal device, a message indicating that the customer is authenticated to access account information associated with one or more accounts maintained by the organization for the customer.

In some embodiments, validating the location information identifying the current location of the mobile computing device may include comparing the location information identifying the current location of the mobile computing device with location validation information defining one or more retail locations of the organization.

In some embodiments, if the location information is invalid, the computing platform may generate an error message. Subsequently, the computing platform may send, via the communication interface, and to the mobile computing device, the error message.

In some embodiments, the mobile computing device may be a banking center tablet device used by a greeter agent of the organization at a banking center where the customer is present. In other embodiments, the mobile computing device may be a customer mobile device that is used by the customer of the organization at a banking center where the customer is present and that was registered with the organization as belonging to the customer.

In some embodiments, the validation code may be a quick response (QR) code. In other embodiments, the validation code may be a one-time passcode (OTP).

In some embodiments, the agent terminal device may be a video teller terminal device used by a video teller agent of the organization at a call center located remotely from a banking center where the customer is present. In some instances, the validation code may be usable to establish the authentication status of the customer with the video teller agent of the organization.

In some embodiments, the agent terminal device may be a banking center teller terminal device used by a teller of the organization at a banking center where the customer is present. In some instances, the validation code may be usable to establish the authentication status of the customer with the teller of the organization at the banking center where the customer is present.

In some embodiments, after receiving the validation code, the computing platform may receive, via the communication interface, and from the agent terminal device, a transaction request involving at least one account of the one or more accounts maintained by the organization for the customer. Subsequently, the computing platform may process the transaction request involving the at least one account of the one or more accounts maintained by the organization for the customer.

In some embodiments, the location information identifying the current location of the mobile computing device may include one or more geographic coordinates determined by the mobile computing device. Additionally or alternatively, the location information identifying the current location of the mobile computing device may include beacon information obtained from a localized beacon signal received by the mobile computing device.

In accordance with one or more additional embodiments, a customer authentication computing platform having at least one processor, a memory, and a communication interface may receive, via the communication interface, and from a mobile computing device, a request to authenticate a customer of an organization. Subsequently, the computing platform may send, via the communication interface, and to the mobile computing device, a first message configured to cause the mobile computing device to prompt the customer of the organization to provide biometric authentication input for validation by the mobile computing device. Thereafter, the computing platform may receive, via the communication interface, and from the mobile computing device, information indicating that the mobile computing device received valid biometric authentication input from the customer. In response to receiving the information indicating that the mobile computing device received the valid biometric authentication input from the customer, the computing platform may send, via the communication interface, and to the mobile computing device, a second message configured to cause the mobile computing device to provide information identifying a current location of the mobile computing device. Subsequently, the computing platform may receive, via the communication interface, and from the mobile computing device, location information identifying the current location of the mobile computing device. Next, the computing platform may validate the location information identifying the current location of the mobile computing device. If the location information is valid, the computing platform may generate a validation code that is usable to establish an authentication status of the customer. Subsequently, the computing platform may send, via the communication interface, and to the mobile computing device, the validation code. Thereafter, the computing platform may receive, via the communication interface, and from an automated transaction device, the validation code. In response to receiving the validation code, the computing platform may send, via the communication interface, and to the automated transaction device, a message indicating that the customer is authenticated to access account information associated with one or more accounts maintained by the organization for the customer.

In some embodiments, validating the location information identifying the current location of the mobile computing device may include comparing the location information identifying the current location of the mobile computing device with location validation information defining one or more retail locations of automated transaction devices operated by the organization.

In some embodiments, the automated transaction device may be an automated teller machine. In other embodiments, the automated transaction device may be an automated teller assistant.

In some embodiments, if the location information is invalid, the computing platform may generate an error message. Subsequently, the computing platform may send, via the communication interface, and to the mobile computing device, the error message.

In some embodiments, the mobile computing device may be a banking center tablet device used by a greeter agent of the organization at a banking center where the customer is present. In other embodiments, the mobile computing device may be a customer mobile device that is used by the customer of the organization at a banking center where the customer is present and that was registered with the organization as belonging to the customer.

In some embodiments, the validation code may be a one-time passcode. In other embodiments, the validation code may be a quick response code. Additionally or alternatively, the validation code may be usable to establish the authentication status of the customer with the automated transaction device.

In some embodiments, after receiving the validation code, the computing platform may receive, via the communication interface, and from the automated transaction device, a transaction request involving at least one account of the one or more accounts maintained by the organization for the customer. Subsequently, the computing platform may process the transaction request involving the at least one account of the one or more accounts maintained by the organization for the customer.

In some embodiments, the location information identifying the current location of the mobile computing device may include one or more geographic coordinates determined by the mobile computing device. Additionally or alternatively, the location information identifying the current location of the mobile computing device may include beacon information obtained from a localized beacon signal received by the mobile computing device. In some instances, the localized beacon signal may be received by the mobile computing device from at least one transmitter physically coupled to the automated transaction device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5I depict another illustrative event sequence for authenticating customers and managing authenticated sessions in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
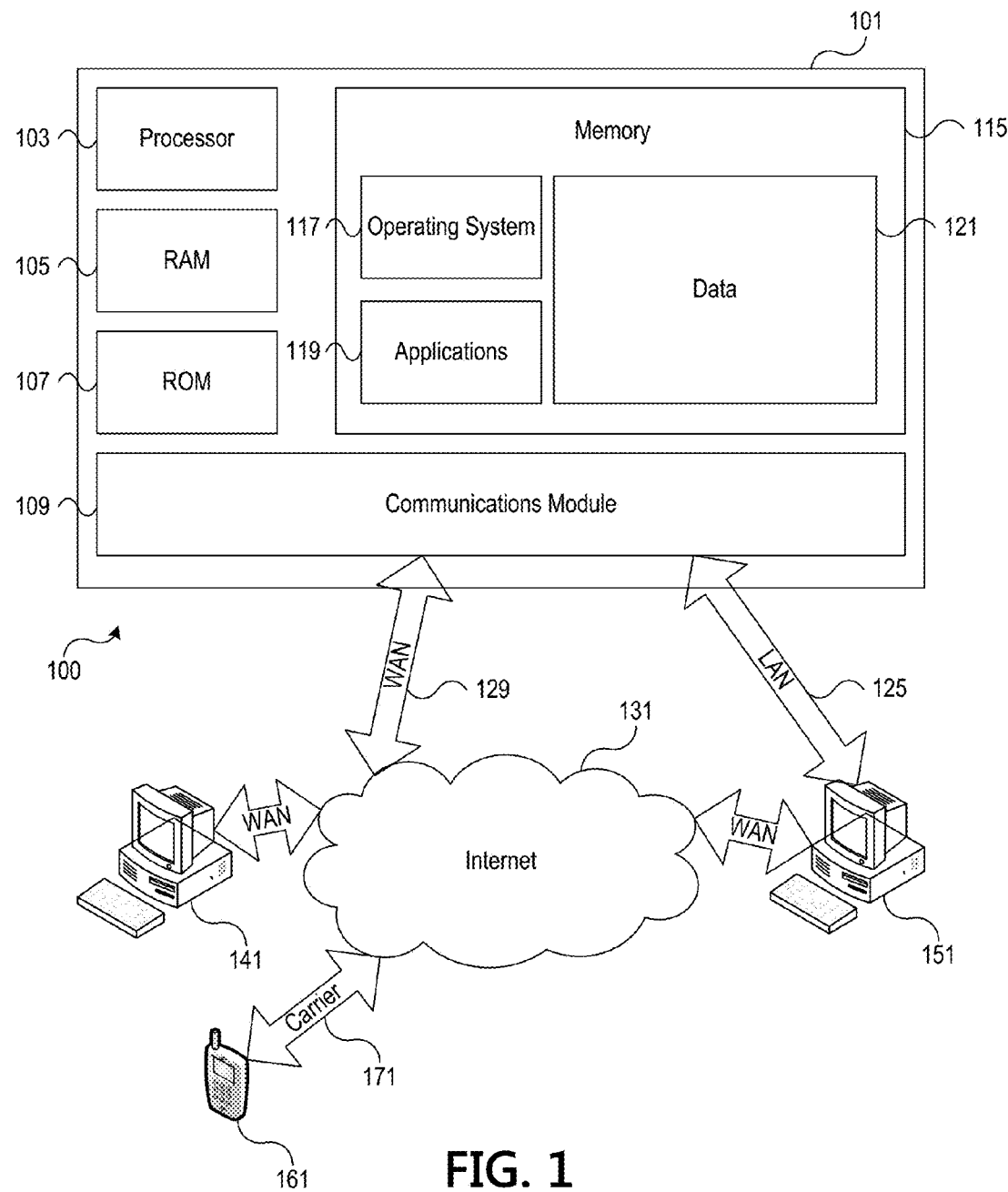
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
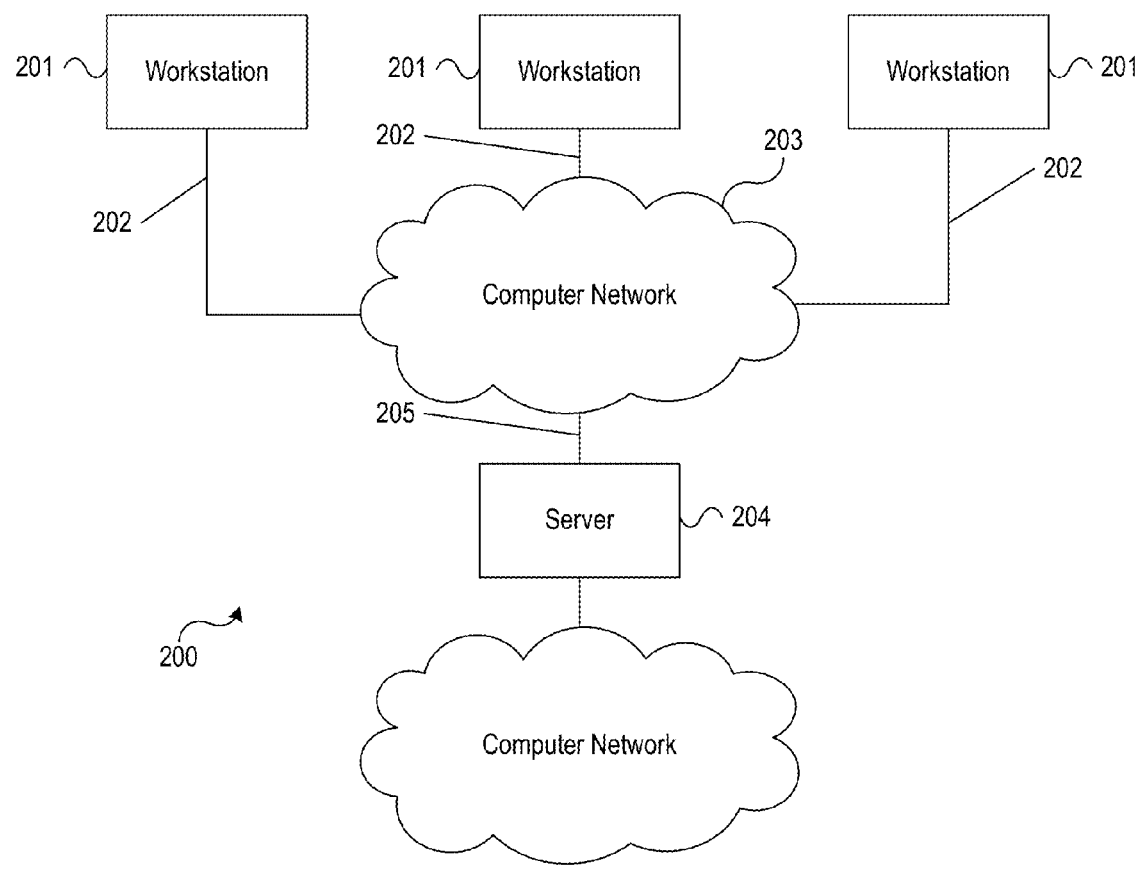
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
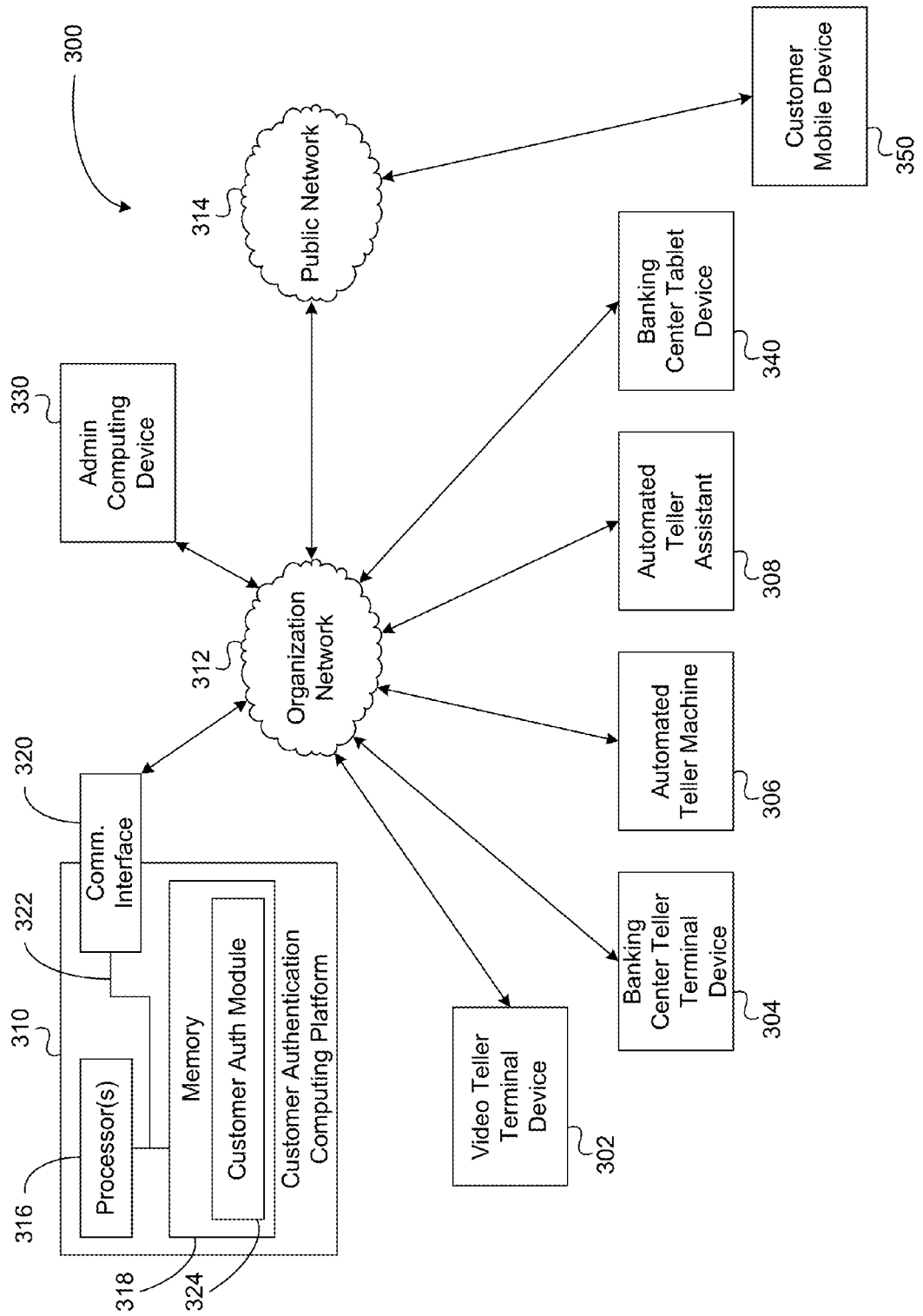
FIG. 3 depicts an illustrative computing environment for authenticating customers and managing authenticated sessions in accordance with one or more example embodiments.

FIG. 3 depicts an illustrative computing environment for authenticating customers and managing authenticated sessions in accordance with one or more example embodiments. Referring to FIG. 3, computing environment 300 may include one or more computing devices. For example, computing environment 300 may include a video teller terminal device 302 (which may, e.g., be used by a remote agent of an organization, such as by a video teller of a financial institution). Computing environment 300 also may include a banking center teller terminal device 304 (which may, e.g., be used by a local agent of an organization in a retail location of the organization, such as by a bank teller of a financial institution who is located in a banking center of the financial institution). Computing environment 300 also may include an automated teller machine 306 (which may, e.g., be an automated teller machine that is configured to dispense funds to customers, accept deposits from customers, allow customers to view account balances, and/or automatically provide other functionalities and which may, e.g., be located in a banking center of a financial institution or in a stand-alone location). Computing environment 300 also may include an automated teller assistant 308 (which may, e.g., be an automated teller assistant device that is configured to enable videoconferences and/or other types of teleconferences between customers and remote agents of a financial institution). Automated teller assistant 308 also may be configured to dispense funds to customers, accept deposits from customers, allow customers to view account balances, and/or automatically provide other functionalities similar to automated teller machine 306. In some instances, automated teller assistant 308 may be located in a banking center of a financial institution, while in other instances, automated teller assistant 308 may be located in a stand-alone location that is remote from and/or different from a banking center of the financial institution.

Computing environment 300 also may include a banking center tablet device 340 (which may, e.g., be a tablet computing device or another type of mobile computing device and which may be located in a banking center of a financial institution and/or used by a greeter or other employee of the financial institution). Computing environment 300 also may include an administrative computing device 330 (which may, e.g., be used by and/or operated by an administrative user or other individual who may be associated with the organization and who may administer and/or otherwise control various computing devices and/or computer systems that are operated by and/or otherwise associated with the organization). Computing environment 300 also may include a customer mobile device 350 (which may, e.g., be a mobile computing device that is used by a customer of an organization, such as a financial institution).

Video teller terminal device 302, banking center teller terminal device 304, automated teller machine 306, automated teller assistant 308, administrative computing device 330, banking center tablet device 340, and customer mobile device 350 may be any type of computing device capable of receiving a user interface, receiving input via the user interface, and communicating the received input to one or more other computing devices. For example, video teller terminal device 302, banking center teller terminal device 304, automated teller machine 306, automated teller assistant 308, administrative computing device 330, banking center tablet device 340, and customer mobile device 350 may be a desktop computer, laptop computer, tablet computer, smart phone, or the like. As noted above, and as illustrated in greater detail below, any and/or all of video teller terminal device 302, banking center teller terminal device 304, automated teller machine 306, automated teller assistant 308, administrative computing device 330, banking center tablet device 340, and customer mobile device 350 may, in some instances, be special-purpose computing devices configured to perform specific functions.

Computing environment 300 also may include one or more computing platforms. For example, computing environment 300 may include customer authentication computing platform 310. Customer authentication computing platform 310 may include one or more computing devices configured to perform one or more of the functions described herein. For example, customer authentication computing platform 310 may include one or more computers (e.g., laptop computers, desktop computers, servers, server blades, or the like).

Computing environment 300 also may include one or more networks, which may interconnect one or more of video teller terminal device 302, banking center teller terminal device 304, automated teller machine 306, automated teller assistant 308, administrative computing device 330, banking center tablet device 340, customer mobile device 350, and customer authentication computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., a corporation, financial institution, educational institution, governmental institution, or the like) and may interconnect one or more computing devices associated with the organization. For example, video teller terminal device 302, banking center teller terminal device 304, automated teller machine 306, automated teller assistant 308, administrative computing device 330, banking center tablet device 340, and customer authentication computing platform 310 may be associated with an organization (e.g., a financial institution), and organization network 312 may be associated with and/or operated by the organization, and may include one or more networks (e.g., LANs, WANs, VPNs, or the like) that interconnect video teller terminal device 302, banking center teller terminal device 304, automated teller machine 306, automated teller assistant 308, administrative computing device 330, banking center tablet device 340, and customer authentication computing platform 310 and one or more other computing devices and/or computer systems that are used by, operated by, and/or otherwise associated with the organization. Public network 314 may connect organization network 312 and/or one or more computing devices connected thereto (e.g., video teller terminal device 302, banking center teller terminal device 304, automated teller machine 306, automated teller assistant 308, administrative computing device 330, banking center tablet device 340, and customer authentication computing platform 310) with one or more networks and/or computing devices that are not associated with the organization. For example, customer mobile device 350 might not be associated with an organization that operates organization network 312, and public network 314 may include one or more networks (e.g., the Internet) that connect customer mobile device 350 to organization network 312 and/or one or more computing devices connected thereto (e.g., video teller terminal device 302, banking center teller terminal device 304, automated teller machine 306, automated teller assistant 308, administrative computing device 330, banking center tablet device 340, and customer authentication computing platform 310).

Customer authentication computing platform 310 may include one or more processor(s) 316, memory 318, communication interface 320, and data bus 322. Data bus 322 may interconnect processor(s) 316, memory 318, and/or communication interface 320. Communication interface 320 may be a network interface configured to support communication between customer authentication computing platform 310 and organization network 312, or one or more sub-networks thereof. Memory 318 may include one or more program modules comprising instructions that when executed by the processor(s) 316 cause customer authentication computing platform 310 to perform one or more functions described herein. For example, memory 318 may include customer authentication module 324, which may comprise instructions that when executed by processor(s) 316 cause customer authentication computing platform 310 to perform one or more functions described herein.

Figure 4A:
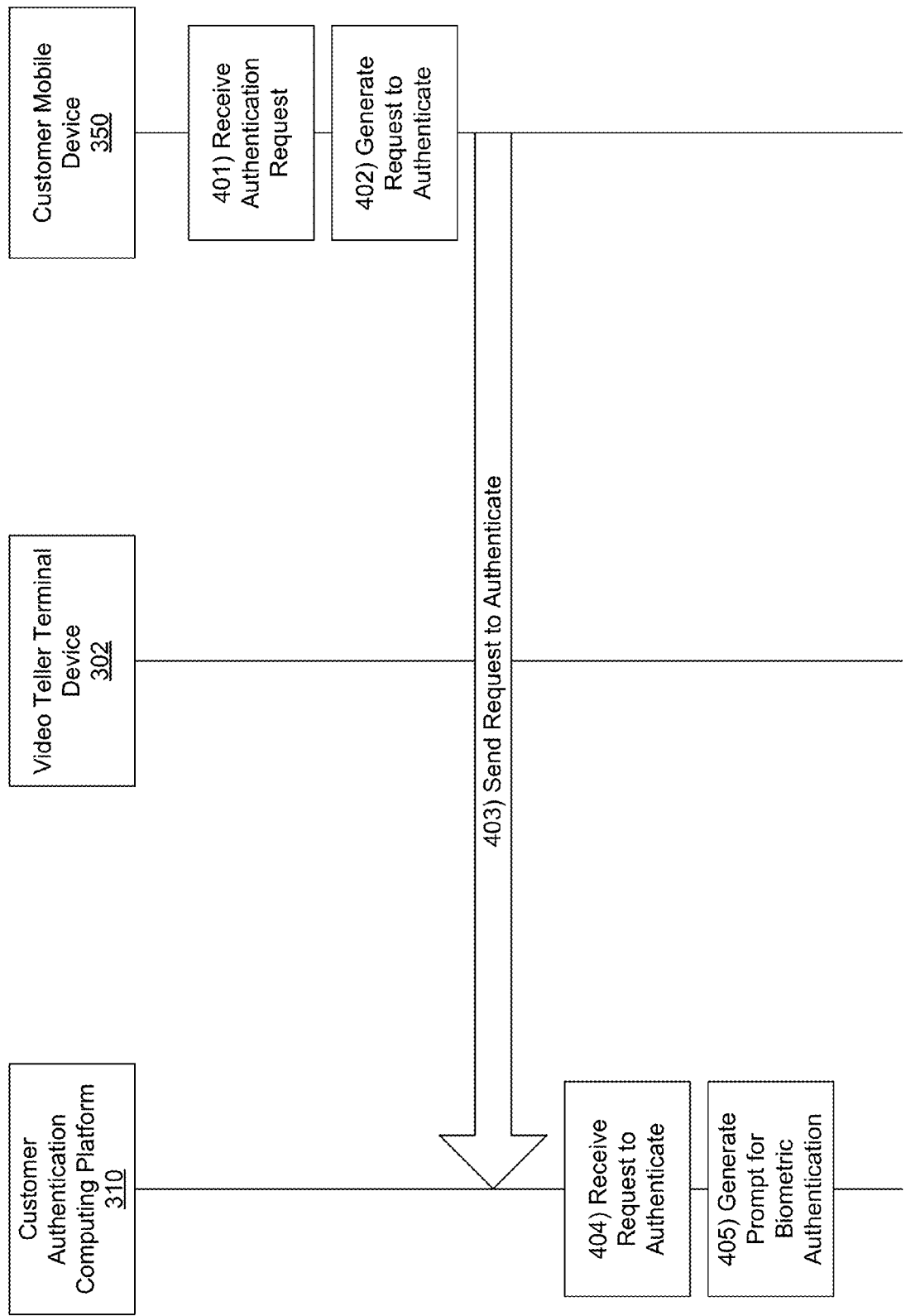
FIGS. 4A-4I depict an illustrative event sequence for authenticating customers and managing authenticated sessions in accordance with one or more example embodiments.

FIGS. 4A-4I depict an illustrative event sequence for authenticating customers and managing authenticated sessions in accordance with one or more example embodiments. Referring to FIG. 4A, at step 401, customer mobile device 350 may receive an authentication request. For example, at step 401, customer mobile device 350 may receive input from a user of customer mobile device 350 requesting to authenticate, so as to establish an authentication status that may enable the user of customer mobile device 350 to access information via customer mobile device 350 and/or to access and/or interact with information and/or property via one or more other channels (e.g., via an in-person teller session, via a teleconference with a remote teller provided by an automated teller assistant), as illustrated in greater detail below. In some instances, such input may be received by customer mobile device 350 after the user of customer mobile device 350 (who may, e.g., be a customer of an organization, such as a financial institution) enters a retail location of the organization (e.g., a banking center of the financial institution), as the user of customer mobile device 350 may wish to establish an authentication status to access and/or interact with one or more accounts, information, and/or other property that may be maintained by the organization for the customer. In other instances, rather than the user of customer mobile device 350 manually providing input requesting to be authenticated, customer mobile device 350 may automatically generate an authentication request (e.g., based on detecting that customer mobile device 350 has entered a retail location of the organization, such as a banking center operated by the financial institution; based on detecting that the user of customer mobile device 350 is initiating an interaction with a greeter employee or local agent of the organization; based on detecting that the user of customer mobile device 350 is initiating a teleconference with a remote agent of the organization; and/or the like).

At step 402, customer mobile device 350 may generate a request to authenticate. For example, based on receiving the authentication request at step 401, customer mobile device 350 may generate a request to authenticate (which may, e.g., be sent to one or more servers operated by the organization, as illustrated in greater detail below). At step 403, customer mobile device 350 may send the request to authenticate to customer authentication computing platform 310.

At step 404, customer authentication computing platform 310 may receive the request to authenticate from customer mobile device 350. For example, at step 404, customer authentication computing platform 310 may receive, via communication interface 320, and from a mobile computing device (e.g., customer mobile device 350), a request to authenticate a customer of an organization (e.g., the organization which may operate customer authentication computing platform 310). In some instances, rather than receiving a request to authenticate from customer mobile device 350 (e.g., at step 404), customer authentication computing platform 310 may receive a request to authenticate from another mobile computing device, such as banking center tablet device 340. In these instances, the sequence of events illustrated in FIGS. 4A-4I may proceed in a similar manner as discussed in the examples below, except one or more steps may be performed by banking center tablet device 340 instead of being performed by customer mobile device 350.

Figure 4B:
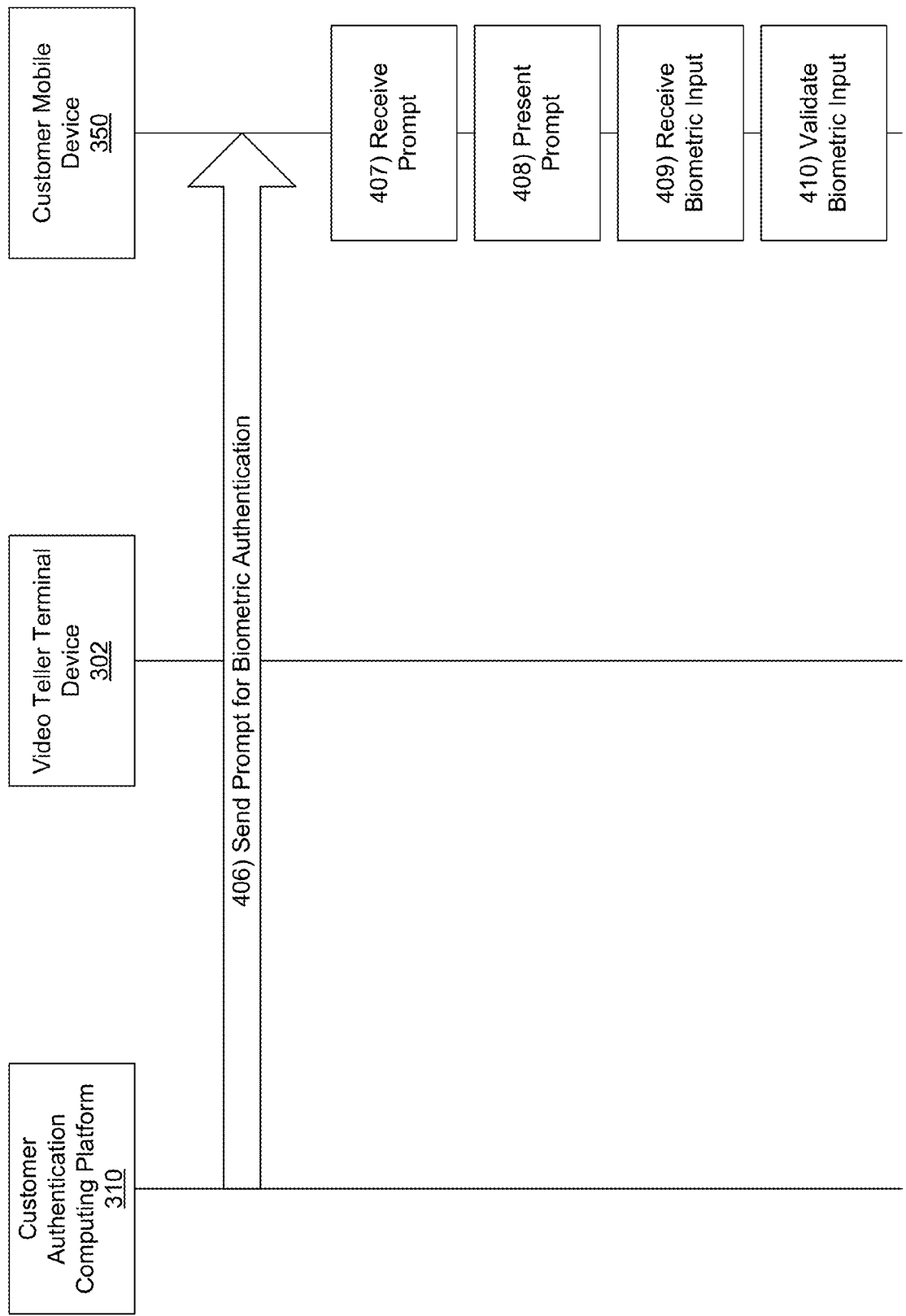

At step 405, customer authentication computing platform 310 may generate a prompt for biometric authentication. For example, at step 405, customer authentication computing platform 310 may generate a notification or user interface that is configured to prompt a user to provide biometric authentication input for validation, such as a voiceprint, a fingerprint, and/or other types of biometric input. Referring to FIG. 4B, at step 406, customer authentication computing platform 310 may send the prompt for biometric authentication to customer mobile device 350. For example, at step 406, customer authentication computing platform 310 may send, via communication interface 320, and to the mobile computing device (e.g., customer mobile device 350, banking center tablet device 340), a first message configured to cause the mobile computing device to prompt the customer of the organization to provide biometric authentication input for validation by the mobile computing device.

Figure 6:
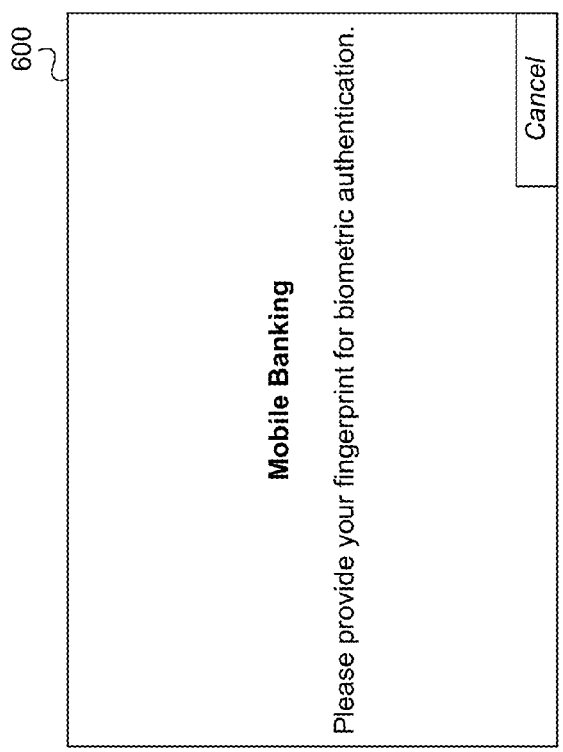

At step 407, customer mobile device 350 may receive the prompt for biometric authentication from customer authentication computing platform 310. At step 408, customer mobile device 350 may present a prompt. For example, in presenting the prompt at step 408, customer mobile device 350 may display, cause to be displayed, and/or otherwise present a graphical user interface similar to graphical user interface 600, which is illustrated in FIG. 6. As seen in FIG. 6, graphical user interface 600 may include text and/or other information prompting the user of customer mobile device 350 to provide biometric input, such as one or more fingerprints, for validation by customer mobile device 350.

Referring again to FIG. 4B, at step 409, customer mobile device 350 may receive biometric input. For example, at step 409, customer mobile device 350 may receive biometric input from the user of customer mobile device 350 that includes one or more fingerprints of the user of customer mobile device 350, one or more voiceprints of the user of customer mobile device 350, one or more images of the user of customer mobile device 350, and/or other biometric input associated with the user of customer mobile device 350. At step 410, customer mobile device 350 may validate the biometric input. For example, at step 410, customer mobile device 350 may compare the biometric input with stored information defining valid biometrics of the user of customer mobile device 350 to determine whether the biometric input is a valid match to the stored information defining the valid biometrics of the user of customer mobile device 350. In validating the biometric input, if customer mobile device 350 determines that the biometric input received from the user of customer mobile device 350 is invalid, customer mobile device 350 may generate and/or present an error message and/or may request the user of customer mobile device 350 to attempt to provide additional biometric input. Alternatively, if customer mobile device 350 determines that the biometric input received from the user of customer mobile device 350 is valid in validating the biometric input, customer mobile device 350 may generate an indication of valid biometric input, as discussed below.

Figure 4C:
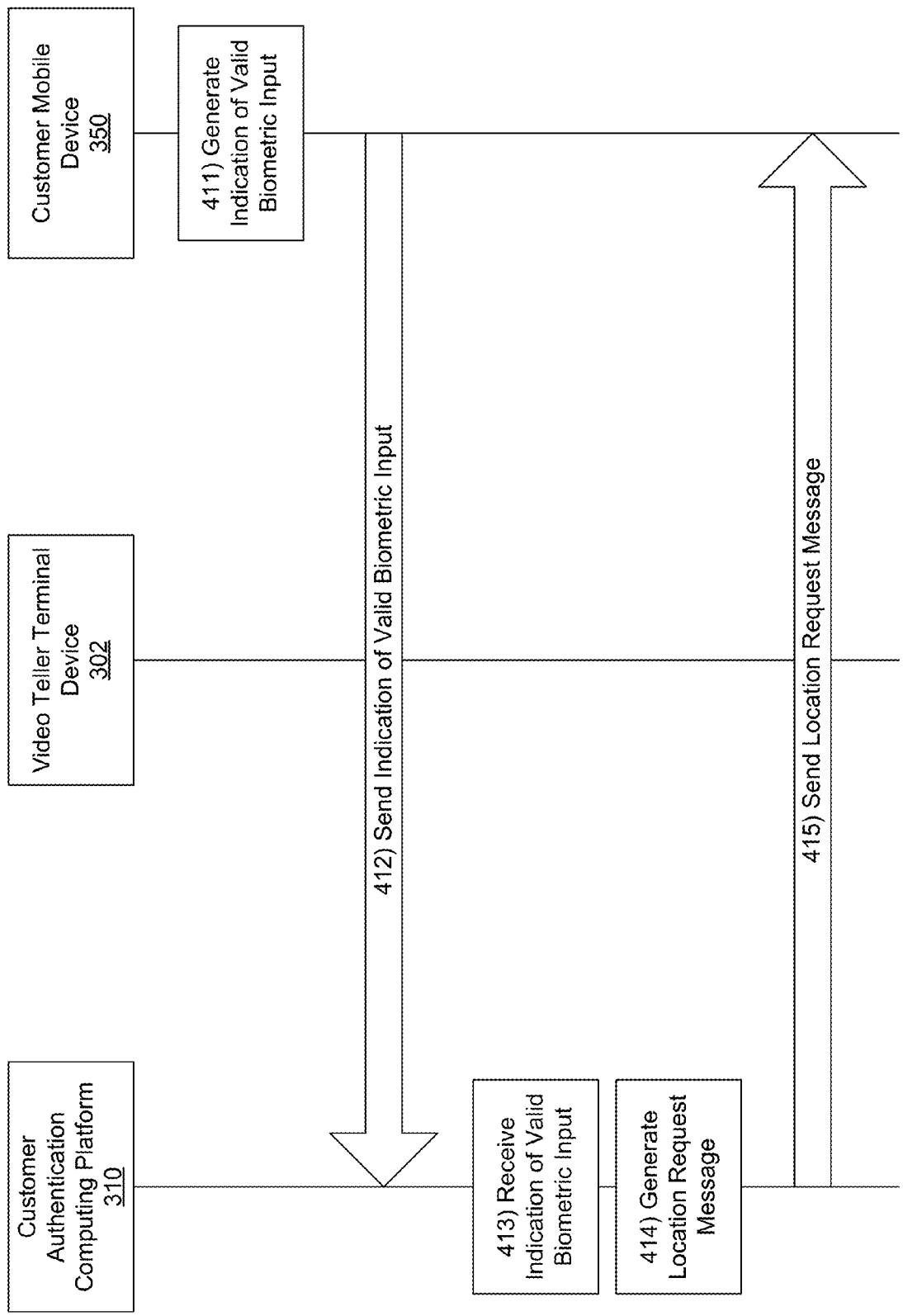

Referring to FIG. 4C, at step 411, customer mobile device 350 may generate an indication of valid biometric input. For example, at step 411, customer mobile device 350 may generate a message that includes information indicating that valid biometric input was received from the user of customer mobile device 350 and/or that the identity of the user of customer mobile device 350 has been verified using such biometric input. At step 412, customer mobile device 350 may send the indication of valid biometric input to customer authentication computing platform 310.

At step 413, customer authentication computing platform 310 may receive the indication of valid biometric input from customer mobile device 350. For example, at step 413, customer authentication computing platform 310 may receive, via communication interface 320, and from the mobile computing device (e.g., customer mobile device 350, banking center tablet device 340), information indicating that the mobile computing device received valid biometric authentication input from the customer. At step 414, customer authentication computing platform 310 may generate a location request message. For example, at step 414, customer authentication computing platform 310 may generate a message requesting location information from customer mobile device 350, and such a message may be configured to cause customer mobile device 350 to provide information identifying the current location of customer mobile device 350. As illustrated in greater detail below, customer authentication computing platform 310 may use such location information to verify that customer mobile device 350 is in a location in which the user of customer mobile device 350 may be able to receive service from an agent and/or device associated with the organization that may operate customer authentication computing platform 310. At step 415, customer authentication computing platform 310 may send the location request message to customer mobile device 350. For example, in response to receiving the information indicating that the mobile computing device (e.g., customer mobile device 350, banking center tablet device 340) received the valid biometric authentication input from the customer, customer authentication computing platform 310 may send, via communication interface 320, and to the mobile computing device, a second message configured to cause the mobile computing device to provide information identifying a current location of the mobile computing device.

Figure 4D:
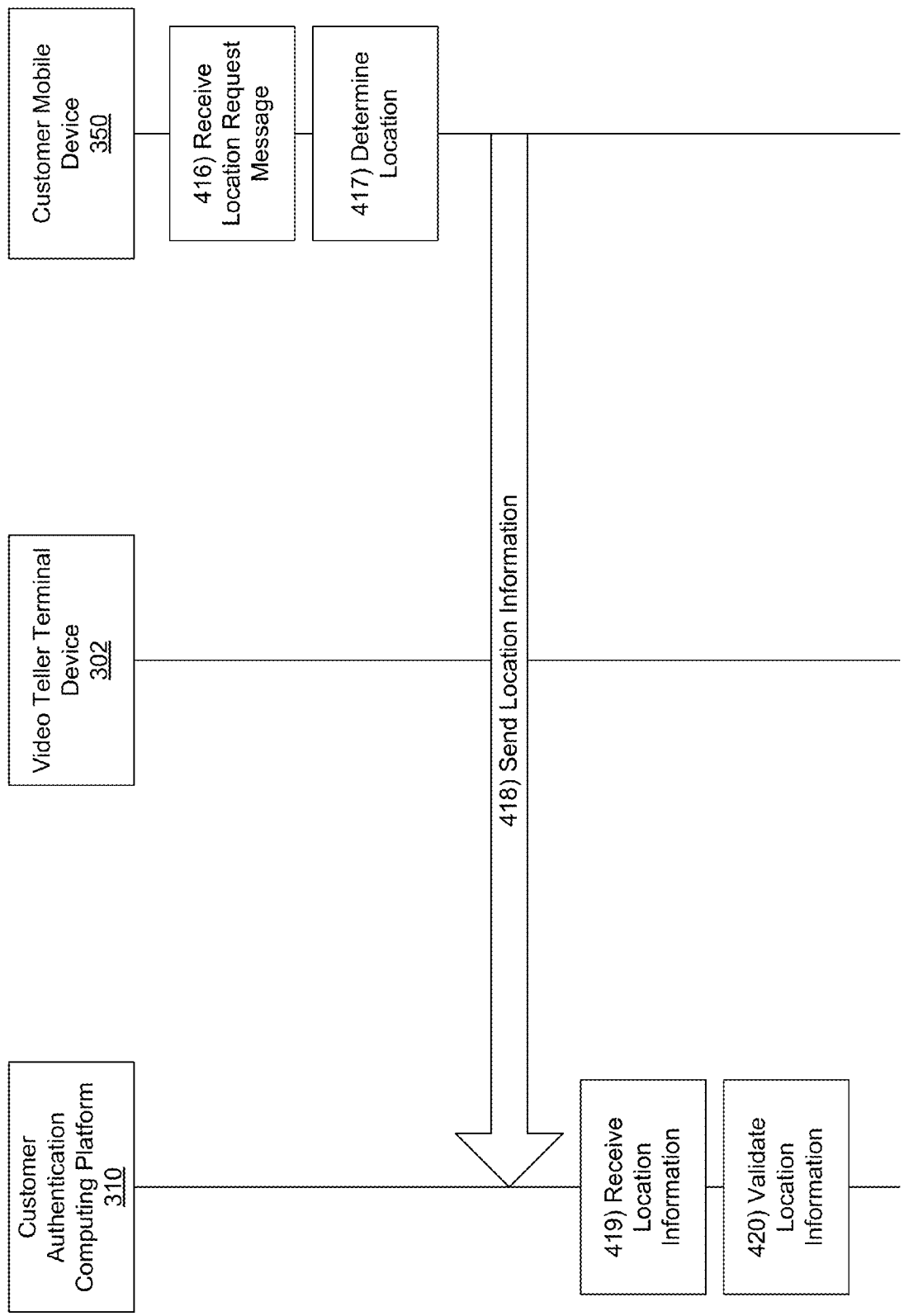
Figure 7:
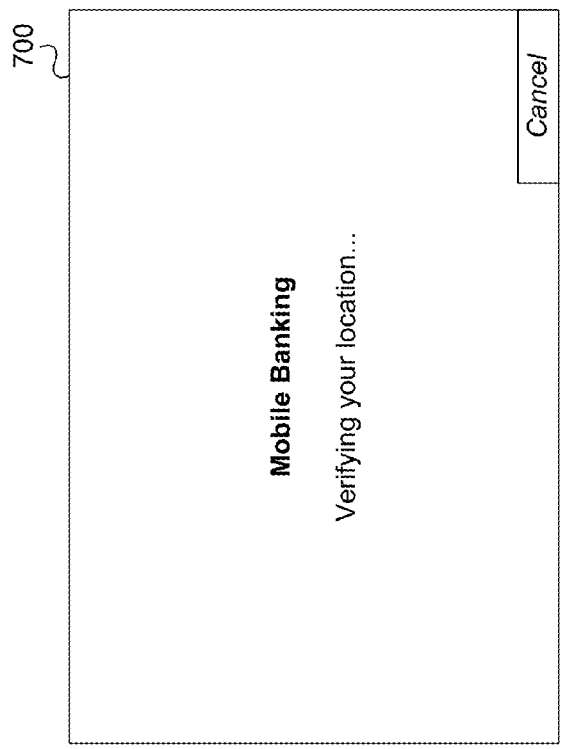
FIGS. 6-19 depict example graphical user interfaces for authenticating customers and managing authenticated sessions in accordance with one or more example embodiments.

Referring to FIG. 4D, at step 416, customer mobile device 350 may receive the location request message. At step 417, customer mobile device 350 may determine the current location of customer mobile device 350. In determining its current location at step 417, customer mobile device 350 may use satellite positioning signals, wireless positioning signals, local beacon signals, and/or other signals to determine the current location of customer mobile device 350. In some instances, when determining the current location of customer mobile device 350, customer mobile device 350 also may display, cause to be displayed, and/or otherwise present a graphical user interface similar to graphical user interface 700, which is illustrated in FIG. 7. As seen in FIG. 7, graphical user interface 700 may include text and/or other information informing the user of customer mobile device 350 that customer mobile device 350 is verifying the location of customer mobile device 350 (e.g., for purposes of authenticating the user of customer mobile device 350, as discussed in greater detail below). Referring again to FIG. 4D, at step 418, customer mobile device 350 may send location information to customer authentication computing platform 310. For example, based on determining its current location at step 417, customer mobile device 350 may, at step 418, send location information identifying the current location of customer mobile device 350.

At step 419, customer authentication computing platform 310 may receive the location information from customer mobile device 350. For example, at step 419, customer authentication computing platform 310 may receive, via communication interface 320, and from the mobile computing device (e.g., customer mobile device 350, banking center tablet device 340), location information identifying the current location of the mobile computing device. At step 420, customer authentication computing platform 310 may validate the location information. For example, at step 420, customer authentication computing platform 310 may validate the location information identifying the current location of the mobile computing device (e.g., customer mobile device 350, banking center tablet device 340).

In some embodiments, validating the location information identifying the current location of the mobile computing device may include comparing the location information identifying the current location of the mobile computing device with location validation information defining one or more retail locations of the organization. For example, in validating the location information at step 420, customer authentication computing platform 310 may compare the location information identifying the current location of the mobile computing device (e.g., customer mobile device 350, banking center tablet device 340) with location information defining one or more retail locations of the organization that may operate customer authentication computing platform 310, such as location information defining one or more banking centers operated by a financial institution that may operate customer authentication computing platform 310. Customer authentication computing platform 310 may compare the location information in this manner in order to determine whether and/or ensure that customer mobile device 350 is located at a retail location of the organization (e.g., at a banking center operated by the financial institution), as customer authentication computing platform 310 might only allow customer mobile device 350 to authenticate in instances in which the user of customer mobile device 350 would be able to receive service from and/or otherwise interact with one or more agents of and/or devices operated by the organization (e.g., the financial institution). Thus, in some arrangements, customer authentication computing platform 310 might only allow customer mobile device 350 to authenticate if the location information indicates that customer mobile device 350 is located in a predefined location of the organization (e.g., at a predefined banking center, at a predefined automated teller machine, at a predefined automated teller assistant, and/or the like).

In some embodiments, the location information identifying the current location of the mobile computing device may include one or more geographic coordinates determined by the mobile computing device. For example, the location information identifying the current location of the mobile computing device (e.g., customer mobile device 350, banking center tablet device 340) may include one or more geographic coordinates determined by the mobile computing device, such as latitude, longitude, and/or the like. As illustrated above, the mobile computing device (e.g., customer mobile device 350, banking center tablet device 340) may determine such coordinates based on various signals that may be received by the mobile computing device, such as satellite positioning signals, wireless positioning signals, local beacon signals, and/or other signals.

In some embodiments, the location information identifying the current location of the mobile computing device may include beacon information obtained from a localized beacon signal received by the mobile computing device. For example, the location information identifying the current location of the mobile computing device (e.g., customer mobile device 350, banking center tablet device 340) may include beacon information obtained from a localized beacon signal received by the mobile computing device. Such beacon information may, for instance, include a unique identifier associated with a specific beacon transmitter that is deployed at a known and/or predefined location, and the beacon transmitter may transmit a low energy signal that may be received by the mobile computing device (e.g., customer mobile device 350, banking center tablet device 340) using low energy proximity sensing. For instance, the beacon information may include a unique identifier corresponding to a beacon transmitter that is deployed at a predefined retail location of the organization operating customer authentication computing platform 310, such as at a particular banking center, at a particular automated teller machine, at a particular automated teller assistant, or at another predefined location that is serviced by and/or otherwise associated with the organization operating customer authentication computing platform 310.

Figure 4E:
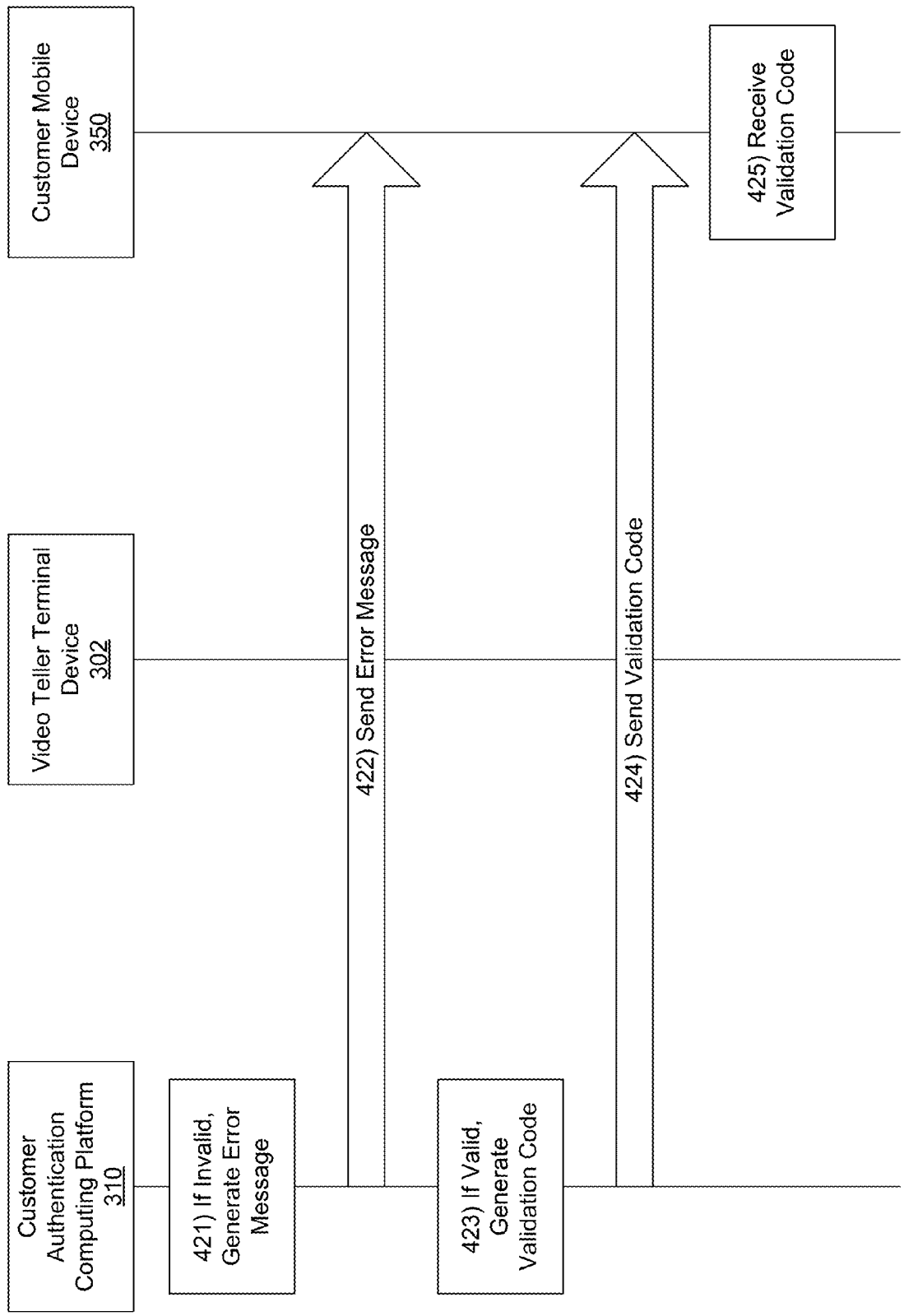

Referring to FIG. 4E, at step 421, if the location information is invalid, customer authentication computing platform 310 may generate an error message, and at step 422, customer authentication computing platform 310 may send the error message to customer mobile device 350. For example, if customer authentication computing platform 310 determines (e.g., at step 420) that the location information identifying the current location of the mobile computing device (e.g., customer mobile device 350, banking center tablet device 340) does not match a predefined location where the organization operating customer authentication computing platform 310 is able to provide service to the user of the mobile computing device and/or otherwise does not match a predefined location where customer authentication computing platform 310 permits authentication for the mobile computing device, then at step 421, customer authentication computing platform 310 may generate an error message, and at step 422, customer authentication computing platform 310 may send, via communication interface 320, and to the mobile computing device, the error message.

Alternatively, if the location information is valid, customer authentication computing platform 310 may generate a validation code at step 423. For example, if the location information is valid, customer authentication computing platform 310 may generate a validation code that is usable to establish an authentication status of the customer using the mobile computing device (e.g., customer mobile device 350, banking center tablet device 340), as illustrated in greater detail below. In some embodiments, the validation code may be a quick response (QR) code. Additionally or alternatively, the validation code may be a one-time passcode (OTP) and/or other type of code.

At step 424, customer authentication computing platform 310 may send the validation code to customer mobile device 350. For example, at step 424, customer authentication computing platform 310 may send, via communication interface 320, and to the mobile computing device (e.g., customer mobile device 350, banking center tablet device 340), the validation code. At step 425, customer mobile device 350 may receive the validation code.

Figure 4F:
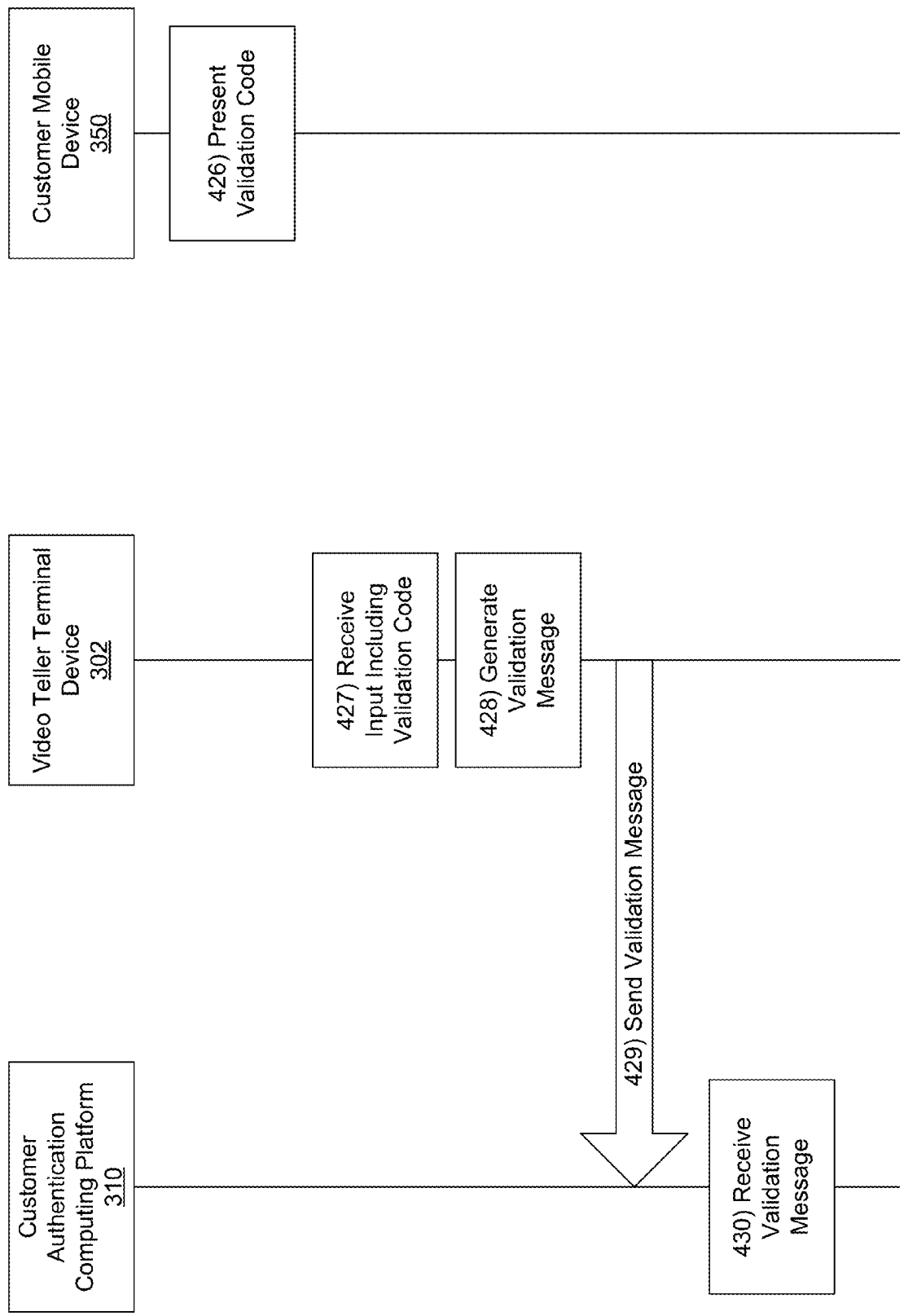
Figure 9:
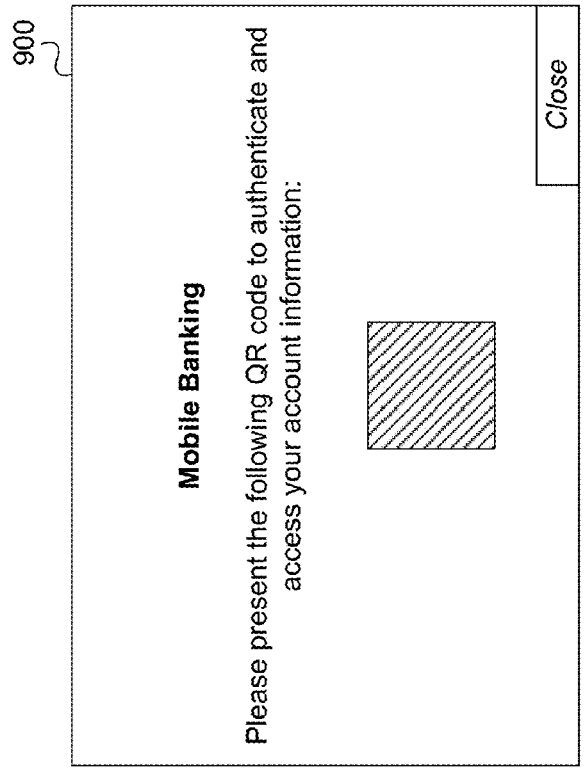
Figure 8:
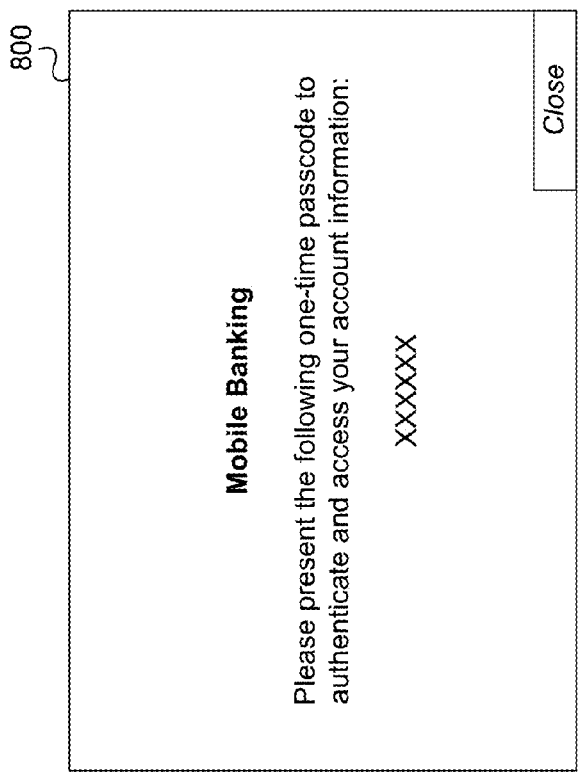

Referring to FIG. 4F, at step 426, customer mobile device 350 may present the validation code. For example, in presenting the validation code at step 426, customer mobile device 350 may display, cause to be displayed, and/or otherwise present a graphical user interface similar to graphical user interface 800, which is illustrated in FIG. 8, or a graphical user interface similar to graphical user interface 900, which is illustrated in FIG. 9. As seen in FIG. 8, graphical user interface 800 may include text and/or other information identifying the validation code (which may, e.g., be a one-time passcode) and/or instructing the user of customer mobile device 350 how to use the validation code to authenticate. As seen in FIG. 9, graphical user interface 900 may likewise include text and/or other information identifying the validation code (which may, e.g., be a QR code) and/or instructing the user of customer mobile device 350 how to use the validation code to authenticate.

Figure 10:
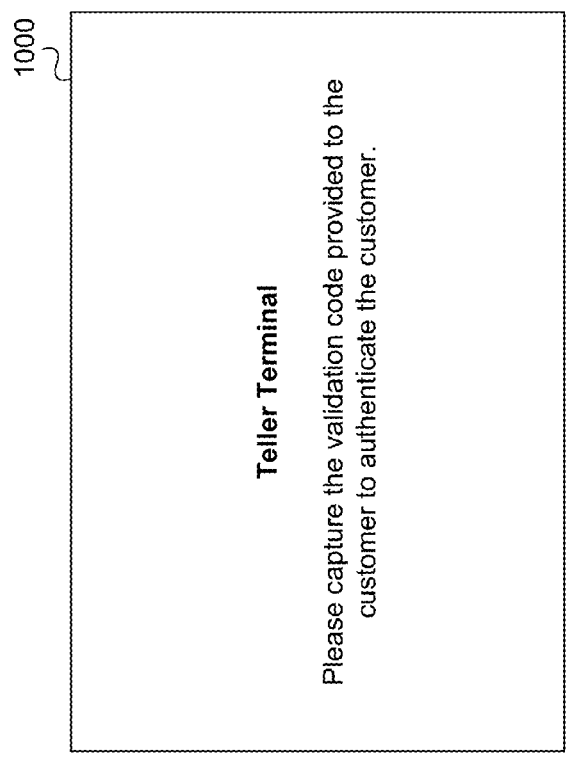

Referring again to FIG. 4F, at step 427, video teller terminal device 302 may receive input that includes the validation code. For example, at step 427, video teller terminal device 302 may receive input from a user of video teller terminal device 302 (who may, e.g., be an agent of the organization operating customer authentication computing platform 310, such as a bank teller of a financial institution which may be operating customer authentication computing platform 310), and such input may include the validation code that was sent to customer mobile device 350. In one or more arrangements, video teller terminal device 302 may receive input that includes the validation code as a result of the customer using the mobile computing device (e.g., customer mobile device 350, banking center tablet device 340) presenting the validation code to the user of video teller terminal device 302 so as to authenticate with and/or otherwise establish the customer's authentication status with the organization that is operating customer authentication computing platform 310. In some instances, when receiving input that includes the validation code, video teller terminal device 302 may display, cause to be displayed, and/or otherwise present a graphical user interface similar to graphical user interface 1000, which is illustrated in FIG. 10. As seen in FIG. 10, graphical user interface 1000 may include text and/or other information instructing the user of video teller terminal device 302 to capture, enter, and/or otherwise provide the validation code provided by the customer using the mobile computing device (e.g., customer mobile device 350, banking center tablet device 340). In some instances, rather than video teller terminal device 302 receiving the validation code (e.g., at step 427), banking center teller terminal device 304 may receive the validation code, as banking center teller terminal device 304 may, for instance, be used by a teller who may be interacting with the customer using the mobile computing device (e.g., customer mobile device 350, banking center tablet device 340). In these instances, the sequence of events illustrated in FIGS. 4A-4I may proceed in a similar manner as discussed in the examples herein, except one or more steps may be performed by banking center teller terminal device 304 instead of being performed by video teller terminal device 302.

Referring again to FIG. 4F, at step 428, video teller terminal device 302 may generate a validation message. For example, at step 428, video teller terminal device 302 may generate a validation message that includes information identifying the validation code received at step 427. At step 429, video teller terminal device 302 may send the validation message to customer authentication computing platform 310.

Figure 4G:
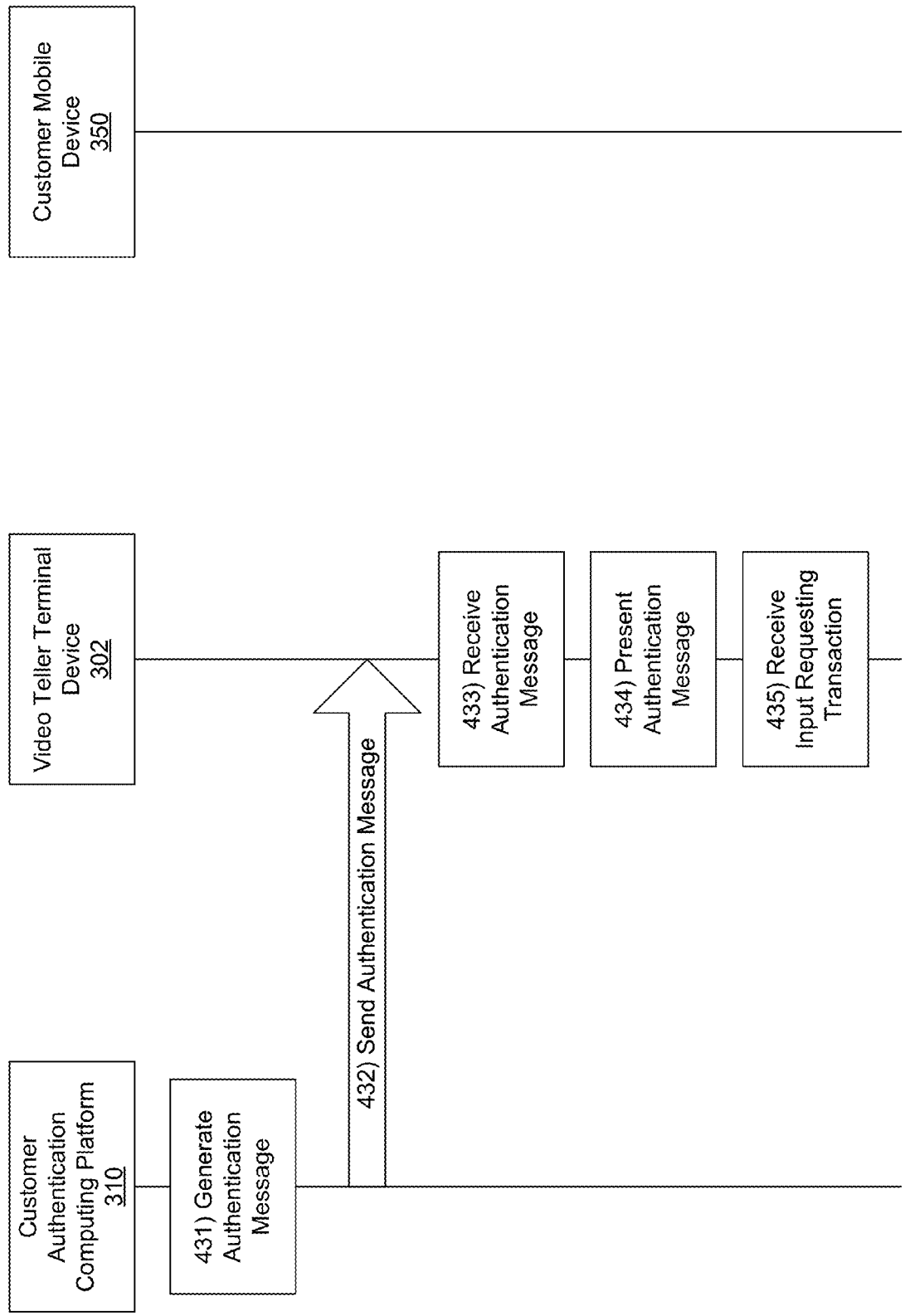

At step 430, customer authentication computing platform 310 may receive the validation message from video teller terminal device 302. For example, at step 430, customer authentication computing platform 310 may receive, via communication interface 320, and from an agent terminal device (e.g., video teller terminal device 302, banking center teller terminal device 304), the validation code. Referring to FIG. 4G, at step 431, customer authentication computing platform 310 may generate an authentication message. For example, based on receiving the validation code from the agent terminal device (e.g., video teller terminal device 302, banking center teller terminal device 304), customer authentication computing platform 310 may generate an authentication message indicating that the customer using the mobile computing device (e.g., customer mobile device 350, banking center tablet device 340) is authenticated and/or otherwise authorized to access account information specific to the customer and/or maintained by the organization for the customer. At step 432, customer authentication computing platform 310 may send the authentication message to video teller terminal device 302. For example, in response to receiving the validation code (e.g., at step 430), customer authentication computing platform 310 may send, via communication interface 320, and to the agent terminal device (e.g., video teller terminal device 302, banking center teller terminal device 304), a message indicating that the customer using the mobile computing device (e.g., customer mobile device 350, banking center tablet device 340) is authenticated to access account information associated with one or more accounts maintained by the organization for the customer.

Figure 11:
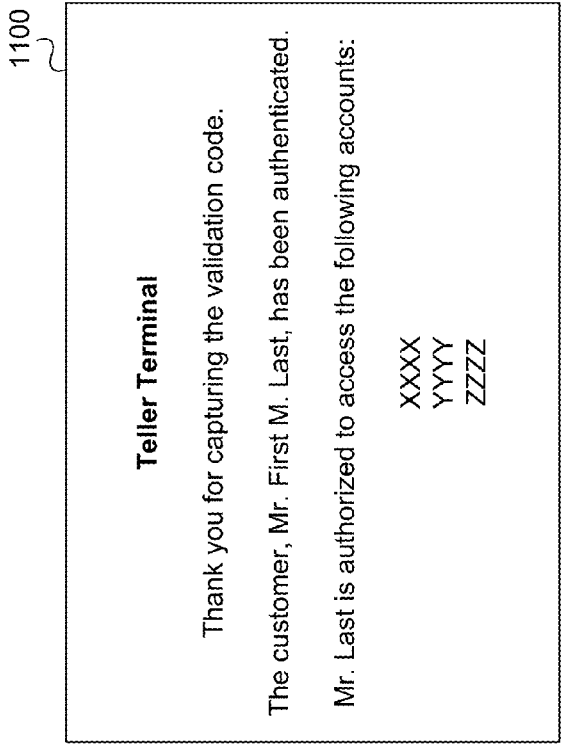

At step 433, video teller terminal device 302 may receive the authentication message from customer authentication computing platform 310. At step 434, video teller terminal device 302 may present the authentication message. For example, in presenting the authentication message at step 434, video teller terminal device 302 may display, cause to be displayed, and/or otherwise present a graphical user interface similar to graphical user interface 1100, which is illustrated in FIG. 11. As seen in FIG. 11, graphical user interface 1100 may include text and/or other information informing the user of video teller terminal device 302 that the customer using the mobile computing device (e.g., customer mobile device 350, banking center tablet device 340) has been authenticated and/or is authorized to access one or more accounts that may be maintained for the customer by the organization operating customer authentication computing platform 310.

At step 435, video teller terminal device 302 may receive input requesting a transaction. For example, at step 435, video teller terminal device 302 may receive input from the user of video teller terminal device 302 requesting a transaction (e.g., a deposit transaction, a withdrawal transaction, a funds transfer transaction, and/or the like) involving one or more accounts that may be maintained for the customer using the mobile computing device (e.g., customer mobile device 350, banking center tablet device 340) by the organization operating customer authentication computing platform 310. Such input may, for instance, be received as a result of the customer requesting the agent operating the agent terminal device (e.g., video teller terminal device 302, banking center teller terminal device 304) to perform one or more transactions after the customer has been authenticated (e.g., after and/or based on the authentication message is generated by customer authentication computing platform 310 and/or sent to video teller terminal device 302).

Figure 4H:
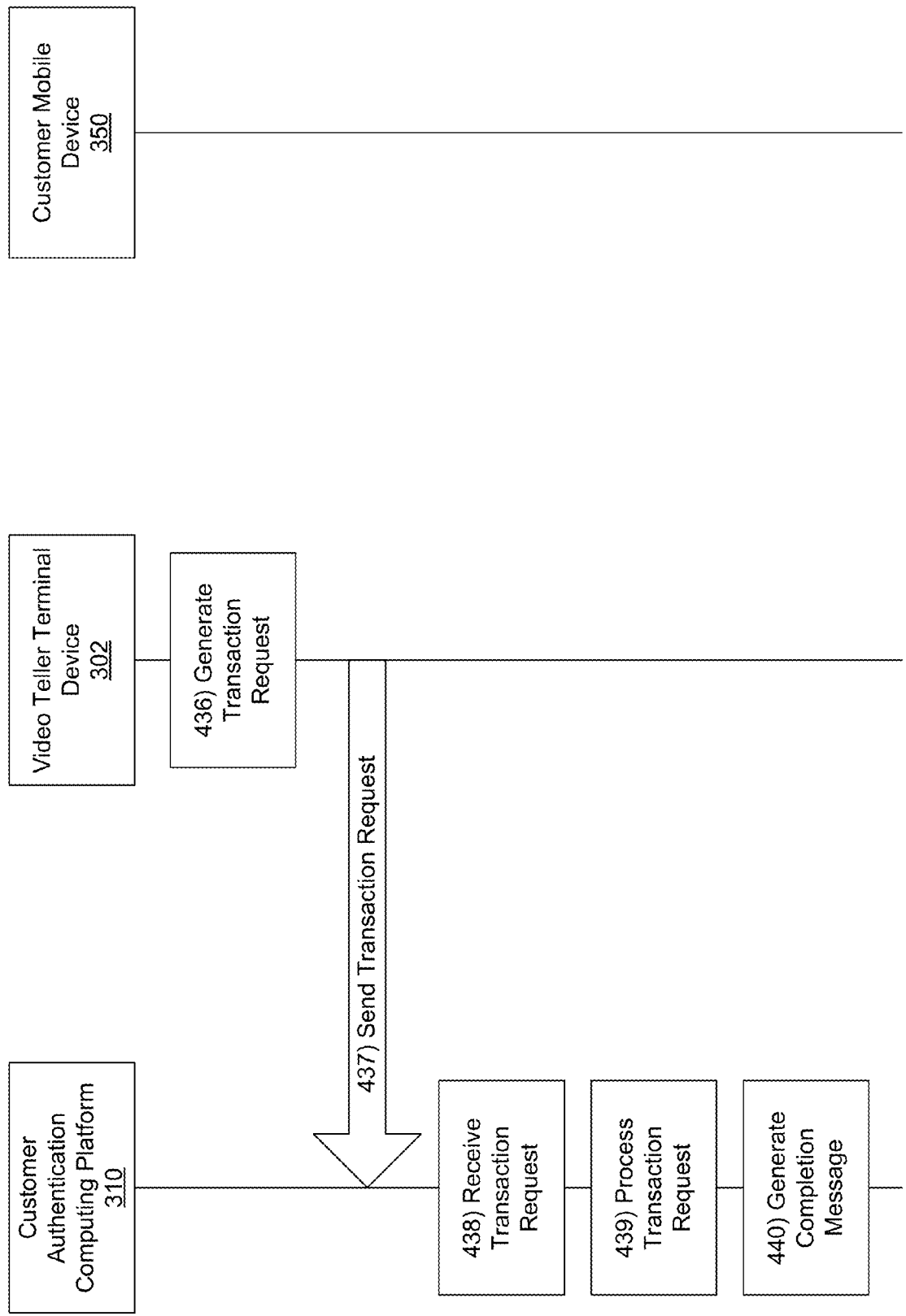

Referring to FIG. 4H, at step 436, video teller terminal device 302 may generate a transaction request. For example, at step 436, video teller terminal device 302 may generate a transaction request based on the input received at step 435. Such a transaction request may, for instance, include information identifying the type of transaction requested (e.g., deposit, withdrawal, funds transfer), the amount of the transaction, a source account, a target account, and/or other information associated with the transaction. At step 437, video teller terminal device 302 may send the transaction request to customer authentication computing platform 310.

At step 438, customer authentication computing platform 310 may receive the transaction request. For example, after receiving the validation code (e.g., at step 427), customer authentication computing platform 310 may receive, via communication interface 320, and from the agent terminal device (e.g., video teller terminal device 302, banking center teller terminal device 304), a transaction request involving at least one account of the one or more accounts maintained by the organization for the customer using the mobile computing device (e.g., customer mobile device 350, banking center tablet device 340).

At step 439, customer authentication computing platform 310 may process the transaction request. For example, at step 439, customer authentication computing platform 310 may process the transaction request involving the at least one account of the one or more accounts maintained by the organization for the customer using the mobile computing device (e.g., customer mobile device 350, banking center tablet device 340). In processing the transaction request, customer authentication computing platform 310 may, for instance, send instructions to and/or otherwise communicate with one or more other computer systems that may be operated by the organization (which may, e.g., be a financial institution) so as to complete the requested transaction. For example, customer authentication computing platform 310 may instruct one or more other computer systems to perform a requested deposit transaction by crediting a particular account, perform a requested withdrawal transaction by debiting a particular account, and/or the like. At step 440, customer authentication computing platform 310 may generate a completion message. For example, after processing the transaction request at step 439, customer authentication computing platform 310 may, at step 440, generate a completion message indicating that the requested transaction has been completed.

Figure 4I:
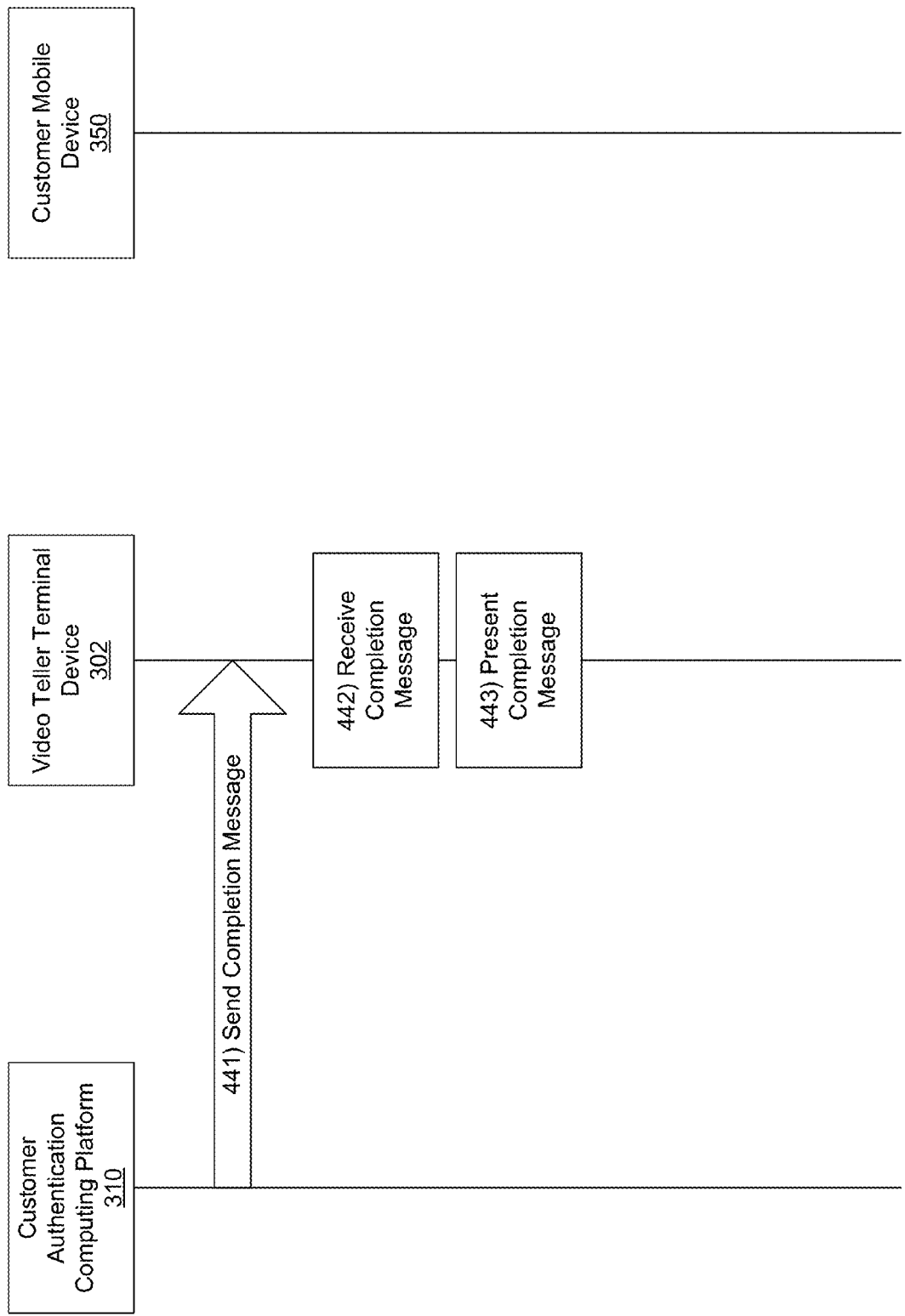
Figure 12:
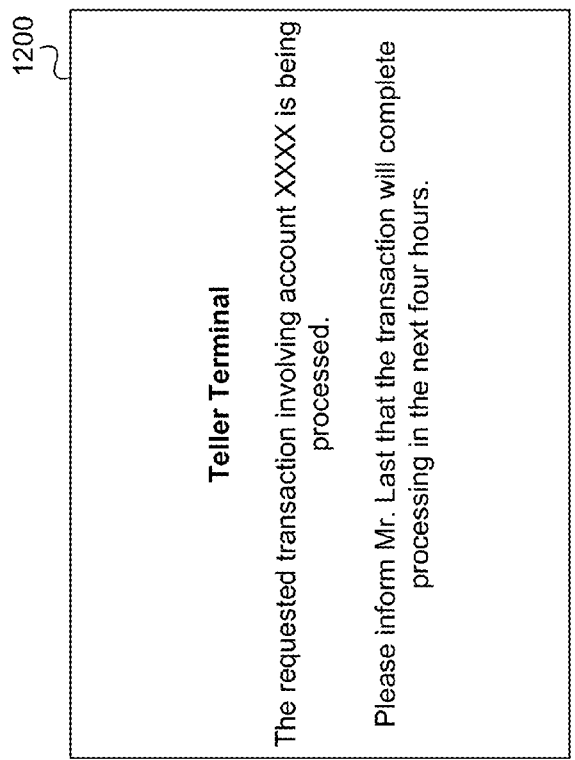

Referring to FIG. 4I, at step 441, customer authentication computing platform 310 may send the completion message to video teller terminal device 302. At step 442, video teller terminal device 302 may receive the completion message from customer authentication computing platform 310. At step 443, video teller terminal device 302 may present the completion message. For example, in presenting the completion message at step 443, video teller terminal device 302 may display, cause to be displayed, and/or otherwise present a graphical user interface similar to graphical user interface 1200, which is illustrated in FIG. 12. As seen in FIG. 12, graphical user interface 1200 may include text and/or other information indicating that the requested transaction has been completed and/or instructing the user of video teller terminal device 302 to inform the customer using the mobile computing device (e.g., customer mobile device 350, banking center tablet device 340) that the transaction has been completed.

In some embodiments, the mobile computing device (which may, e.g., perform various steps of the event sequence described above, such as those described as being performed by customer mobile device 350) may be a banking center tablet device used by a greeter agent of the organization at a banking center where the customer is present. For example, the mobile computing device may, in some instances, be banking center tablet device 340, which may be used by a greeter agent of the organization operating customer authentication computing platform 310 at a banking center where the customer using the mobile computing device is present.

In some embodiments, the mobile computing device (which may, e.g., perform various steps of the event sequence described above, such as those described as being performed by customer mobile device 350) may be a customer mobile device that is used by the customer of the organization at a banking center where the customer is present and that was registered with the organization as belonging to the customer. For example, the mobile computing device may, in some instances, be customer mobile device 350, which may be used by the customer of the organization at a banking center operated by the organization that also operated customer authentication computing platform 310. In addition, customer mobile device 350 may, in some instances, be registered with the organization as belonging to the customer (e.g., during a pre-registration process which may be performed by customer mobile device 350 and/or customer authentication computing platform 310 before step 401 of the event sequence described above).

In some embodiments, the agent terminal device (which may, e.g., perform various steps of the event sequence described above, such as those described as being performed by video teller terminal device 302) may be a video teller terminal device used by a video teller agent of the organization at a call center located remotely from a banking center where the customer is present. For example, the agent terminal device may, in some instances, be video teller terminal device 302, which may be used by a video teller agent of the organization operating customer authentication computing platform 310 at a call center that is located remotely from a banking center where the customer is present. Additionally or alternatively, the validation code may be usable to establish the authentication status of the customer with the video teller agent of the organization. For example, the validation code (which may, e.g., be generated by customer authentication computing platform 310 and provided to the mobile computing device being used by the customer) may be useable by the customer to authenticate with and/or otherwise gain access to the customer's accounts during a teleconference session with the video teller agent using video teller terminal device 302.

In some embodiments, the agent terminal device (which may, e.g., perform various steps of the event sequence described above, such as those described as being performed by video teller terminal device 302) may be a banking center teller terminal device used by a teller of the organization at a banking center where the customer is present. For example, the agent terminal device may, in some instances, be banking center teller terminal device 304, which may be used by a teller of the organization operating customer authentication computing platform 310 who is located at a banking center where the customer is also located. Additionally or alternatively, the validation code may be usable to establish the authentication status of the customer with the teller of the organization at the banking center where the customer is present. For example, the validation code (which may, e.g., be generated by customer authentication computing platform 310 and provided to the mobile computing device being used by the customer) may be useable by the customer to authenticate with and/or otherwise gain access to the customer's accounts during an in-person session with the teller using banking center teller terminal device 304.

Figure 5A:
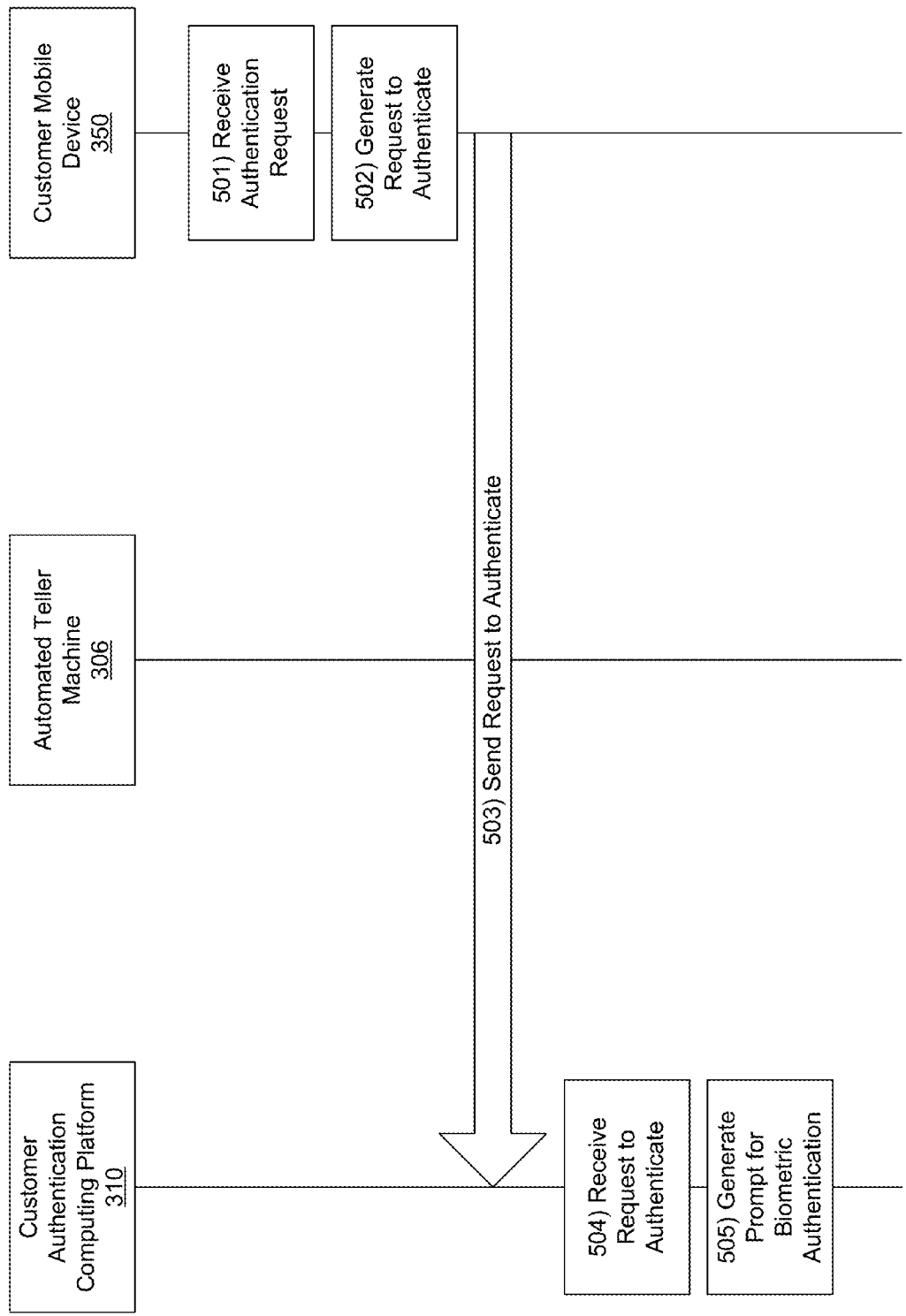

FIGS. 5A-5I depict another illustrative event sequence for authenticating customers and managing authenticated sessions in accordance with one or more example embodiments. Referring to FIG. 5A, at step 501, customer mobile device 350 may receive an authentication request. For example, at step 501, customer mobile device 350 may receive input from a user of customer mobile device 350 requesting to authenticate, so as to establish an authentication status that may enable the user of customer mobile device 350 to access information via customer mobile device 350 and/or to access and/or interact with information and/or property via one or more other channels (e.g., via an automated session provided by an automated teller machine, an automated teller assistant, or another type of automated transaction device), as illustrated in greater detail below. In some instances, such input may be received by customer mobile device 350 after the user of customer mobile device 350 (who may, e.g., be a customer of an organization, such as a financial institution) approaches an automated transaction device, such as an automated teller machine or an automated teller assistant, as the user of customer mobile device 350 may wish to establish an authentication status to access and/or interact with one or more accounts, information, and/or other property that may be maintained by the organization for the customer. In other instances, rather than the user of customer mobile device 350 manually providing input requesting to be authenticated, customer mobile device 350 may automatically generate an authentication request (e.g., based on detecting that customer mobile device 350 has approached an automated transaction device, such as an automated teller machine or an automated teller assistant).

At step 502, customer mobile device 350 may generate a request to authenticate. For example, based on receiving the authentication request at step 401, customer mobile device 350 may generate a request to authenticate (which may, e.g., be sent to one or more servers operated by the organization, as illustrated in greater detail below). At step 503, customer mobile device 350 may send the request to authenticate to customer authentication computing platform 310.

At step 504, customer authentication computing platform 310 may receive the request to authenticate from customer mobile device 350. For example, at step 504, customer authentication computing platform 310 may receive, via communication interface 320, and from a mobile computing device (e.g., customer mobile device 350), a request to authenticate a customer of an organization (e.g., the organization which may operate customer authentication computing platform 310). In some instances, rather than receiving a request to authenticate from customer mobile device 350 (e.g., at step 504), customer authentication computing platform 310 may receive a request to authenticate from another mobile computing device, such as banking center tablet device 340. In these instances, the sequence of events illustrated in FIGS. 5A-5I may proceed in a similar manner as discussed in the examples below, except one or more steps may be performed by banking center tablet device 340 instead of being performed by customer mobile device 350.

Figure 5B:
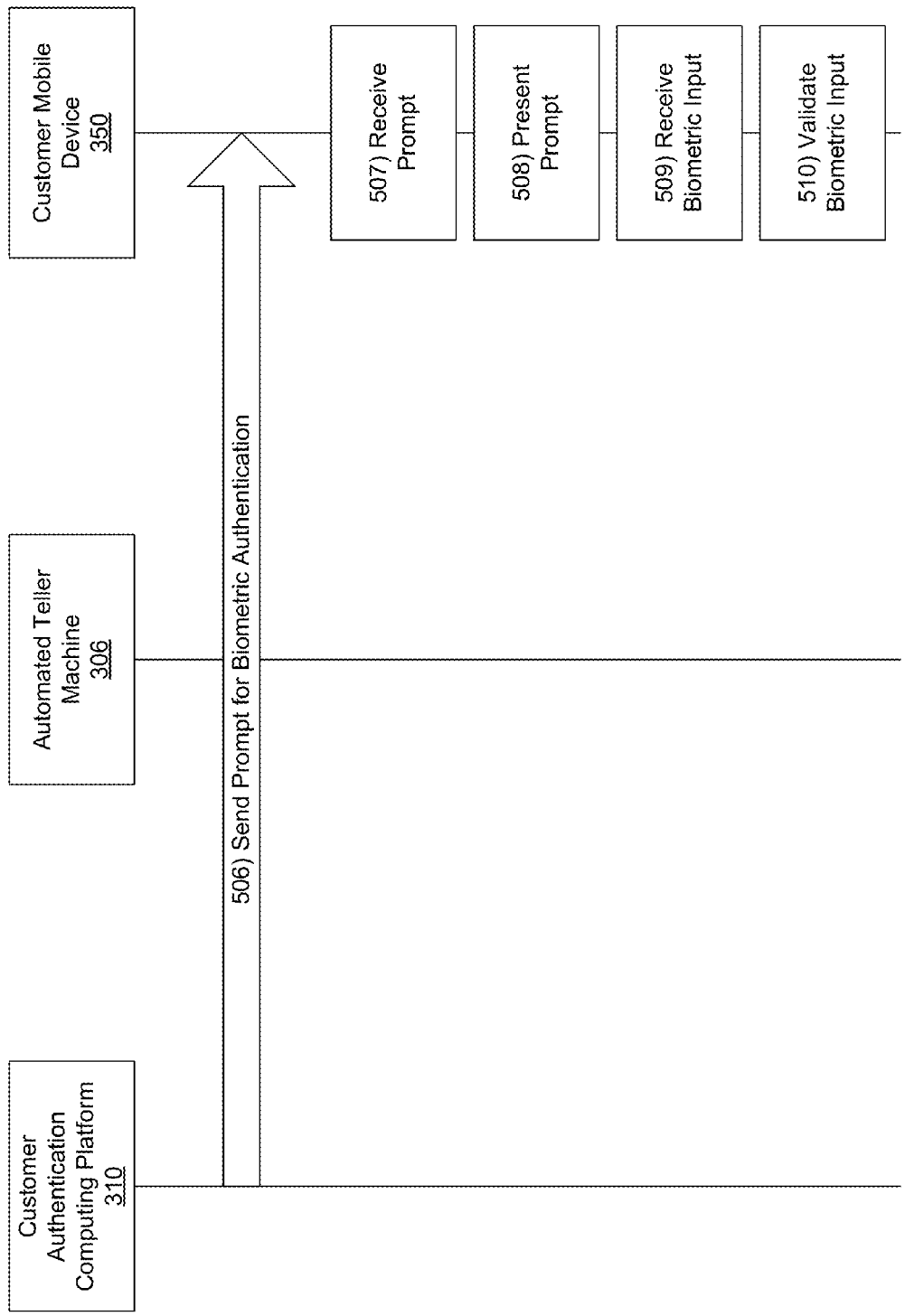

At step 505, customer authentication computing platform 310 may generate a prompt for biometric authentication. For example, at step 505, customer authentication computing platform 310 may generate a notification or user interface that is configured to prompt a user to provide biometric authentication input for validation, such as a voiceprint, a fingerprint, and/or other types of biometric input. Referring to FIG. 5B, at step 506, customer authentication computing platform 310 may send the prompt for biometric authentication to customer mobile device 350. For example, at step 506, customer authentication computing platform 310 may send, via communication interface 320, and to the mobile computing device (e.g., customer mobile device 350, banking center tablet device 340), a first message configured to cause the mobile computing device to prompt the customer of the organization to provide biometric authentication input for validation by the mobile computing device.

Figure 13:
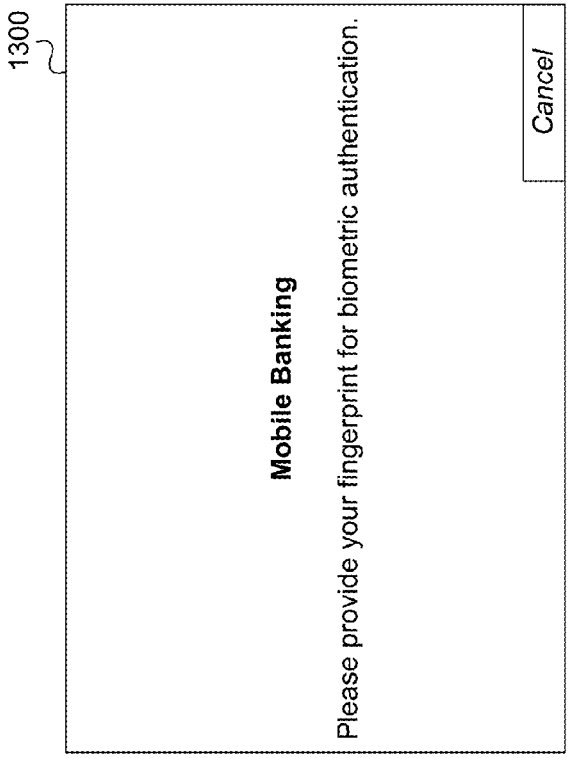

At step 507, customer mobile device 350 may receive the prompt for biometric authentication from customer authentication computing platform 310. At step 508, customer mobile device 350 may present a prompt. For example, in presenting the prompt at step 508, customer mobile device 350 may display, cause to be displayed, and/or otherwise present a graphical user interface similar to graphical user interface 1300, which is illustrated in FIG. 13. As seen in FIG. 13, graphical user interface 1300 may include text and/or other information prompting the user of customer mobile device 350 to provide biometric input, such as one or more fingerprints, for validation by customer mobile device 350.

Referring again to FIG. 5B, at step 509, customer mobile device 350 may receive biometric input. For example, at step 509, customer mobile device 350 may receive biometric input from the user of customer mobile device 350 that includes one or more fingerprints of the user of customer mobile device 350, one or more voiceprints of the user of customer mobile device 350, one or more images of the user of customer mobile device 350, and/or other biometric input associated with the user of customer mobile device 350. At step 510, customer mobile device 350 may validate the biometric input. For example, at step 510, customer mobile device 350 may compare the biometric input with stored information defining valid biometrics of the user of customer mobile device 350 to determine whether the biometric input is a valid match to the stored information defining the valid biometrics of the user of customer mobile device 350. In validating the biometric input, if customer mobile device 350 determines that the biometric input received from the user of customer mobile device 350 is invalid, customer mobile device 350 may generate and/or present an error message and/or may request the user of customer mobile device 350 to attempt to provide additional biometric input. Alternatively, if customer mobile device 350 determines that the biometric input received from the user of customer mobile device 350 is valid in validating the biometric input, customer mobile device 350 may generate an indication of valid biometric input, as discussed below.

Referring to FIG. 5C, at step 511, customer mobile device 350 may generate an indication of valid biometric input. For example, at step 511, customer mobile device 350 may generate a message that includes information indicating that valid biometric input was received from the user of customer mobile device 350 and/or that the identity of the user of customer mobile device 350 has been verified using such biometric input. At step 512, customer mobile device 350 may send the indication of valid biometric input to customer authentication computing platform 310.

At step 513, customer authentication computing platform 310 may receive the indication of valid biometric input from customer mobile device 350. For example, at step 513, customer authentication computing platform 310 may receive, via communication interface 320, and from the mobile computing device (e.g., customer mobile device 350, banking center tablet device 340), information indicating that the mobile computing device received valid biometric authentication input from the customer. At step 514, customer authentication computing platform 310 may generate a location request message. For example, at step 514, customer authentication computing platform 310 may generate a message requesting location information from customer mobile device 350, and such a message may be configured to cause customer mobile device 350 to provide information identifying the current location of customer mobile device 350. As illustrated in greater detail below, customer authentication computing platform 310 may use such location information to verify that customer mobile device 350 is in a location in which the user of customer mobile device 350 may be able to receive service from an automated transaction device, such as an automated teller machine or an automated teller assistant, associated with the organization that may operate customer authentication computing platform 310. At step 515, customer authentication computing platform 310 may send the location request message to customer mobile device 350. For example, in response to receiving the information indicating that the mobile computing device (e.g., customer mobile device 350, banking center tablet device 340) received the valid biometric authentication input from the customer, customer authentication computing platform 310 may send, via communication interface 320, and to the mobile computing device, a second message configured to cause the mobile computing device to provide information identifying a current location of the mobile computing device.

Figure 5D:
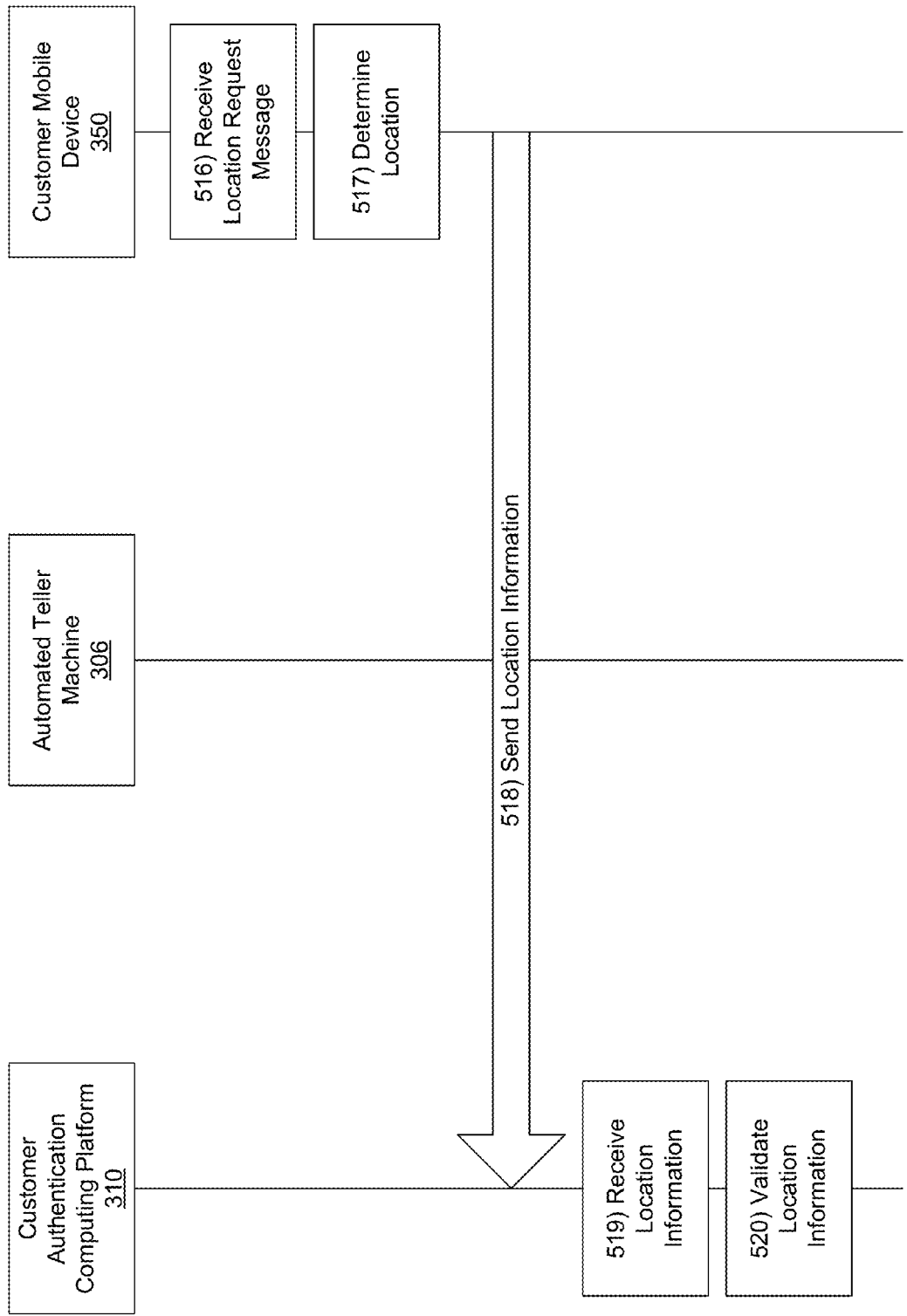
Figure 14:
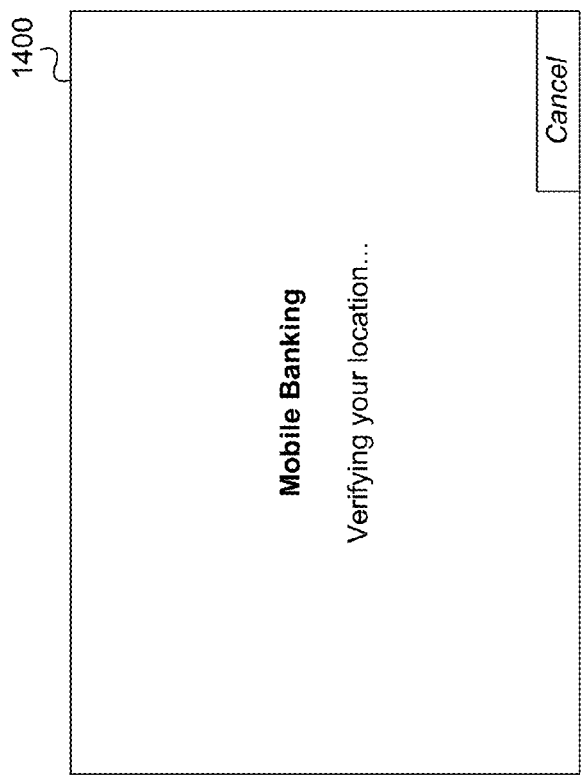

Referring to FIG. 5D, at step 516, customer mobile device 350 may receive the location request message. At step 517, customer mobile device 350 may determine the current location of customer mobile device 350. In determining its current location at step 517, customer mobile device 350 may use satellite positioning signals, wireless positioning signals, local beacon signals, and/or other signals to determine the current location of customer mobile device 350. In some instances, when determining the current location of customer mobile device 350, customer mobile device 350 also may display, cause to be displayed, and/or otherwise present a graphical user interface similar to graphical user interface 1400, which is illustrated in FIG. 14. As seen in FIG. 14, graphical user interface 1400 may include text and/or other information informing the user of customer mobile device 350 that customer mobile device 350 is verifying the location of customer mobile device 350 (e.g., for purposes of authenticating the user of customer mobile device 350, as discussed in greater detail below). Referring again to FIG. 5D, at step 518, customer mobile device 350 may send location information to customer authentication computing platform 310. For example, based on determining its current location at step 517, customer mobile device 350 may, at step 518, send location information identifying the current location of customer mobile device 350.

At step 519, customer authentication computing platform 310 may receive the location information from customer mobile device 350. For example, at step 519, customer authentication computing platform 310 may receive, via communication interface 320, and from the mobile computing device (e.g., customer mobile device 350, banking center tablet device 340), location information identifying the current location of the mobile computing device.

In some embodiments, the location information identifying the current location of the mobile computing device may include one or more geographic coordinates determined by the mobile computing device. For example, the location information identifying the current location of the mobile computing device (e.g., customer mobile device 350, banking center tablet device 340) may include one or more geographic coordinates determined by the mobile computing device, such as latitude, longitude, and/or the like. As illustrated above, the mobile computing device (e.g., customer mobile device 350, banking center tablet device 340) may determine such coordinates based on various signals that may be received by the mobile computing device, such as satellite positioning signals, wireless positioning signals, local beacon signals, and/or other signals.

In some embodiments, the location information identifying the current location of the mobile computing device may include beacon information obtained from a localized beacon signal received by the mobile computing device. For example, the location information identifying the current location of the mobile computing device (e.g., customer mobile device 350, banking center tablet device 340) may include beacon information obtained from a localized beacon signal received by the mobile computing device. Such beacon information may, for instance, include a unique identifier associated with a specific beacon transmitter that is deployed at a known and/or predefined location, and the beacon transmitter may transmit a low energy signal that may be received by the mobile computing device (e.g., customer mobile device 350, banking center tablet device 340) using low energy proximity sensing. For instance, the beacon information may include a unique identifier corresponding to a beacon transmitter that is deployed at a predefined retail location of the organization operating customer authentication computing platform 310, such as at a particular banking center, at a particular automated teller machine, at a particular automated teller assistant, or at another predefined location that is serviced by and/or otherwise associated with the organization operating customer authentication computing platform 310.

In some embodiments, the localized beacon signal may be received by the mobile computing device from at least one transmitter physically coupled to the automated transaction device. For example, in some instances, the localized beacon signal may be received by the mobile computing device (e.g., customer mobile device 350, banking center tablet device 340) from one or more transmitters that are included in and/or connected to an automated transaction device, such as an automated teller machine or an automated teller assistant, with which the user of the mobile computing device may be attempting to authenticate, as illustrated in greater detail below.

At step 520, customer authentication computing platform 310 may validate the location information. For example, at step 520, customer authentication computing platform 310 may validate the location information identifying the current location of the mobile computing device (e.g., customer mobile device 350, banking center tablet device 340). In some embodiments, validating the location information identifying the current location of the mobile computing device may include comparing the location information identifying the current location of the mobile computing device with location validation information defining one or more retail locations of automated transaction devices operated by the organization. For example, in validating the location information at step 520, customer authentication computing platform 310 may compare the location information identifying the current location of the mobile computing device (e.g., customer mobile device 350, banking center tablet device 340) with location information defining one or more retail locations of automated transaction devices operated by the organization (which may, e.g., also operate customer authentication computing platform 310), such as location information identifying the deployment locations of various automated teller machines and/or automated teller assistants operated by a financial institution that may operate customer authentication computing platform 310. Customer authentication computing platform 310 may compare the location information in this manner in order to determine whether and/or ensure that customer mobile device 350 is located at a location where an automated transaction device is deployed, as customer authentication computing platform 310 might only allow customer mobile device 350 to authenticate in instances in which the user of customer mobile device 350 would be able to receive service from and/or otherwise interact with an automated transaction device operated by the organization (e.g., the financial institution). Thus, in some arrangements, customer authentication computing platform 310 might only allow customer mobile device 350 to authenticate if the location information indicates that customer mobile device 350 is located in a predefined location where an automated transaction device is deployed.

Figure 5E:
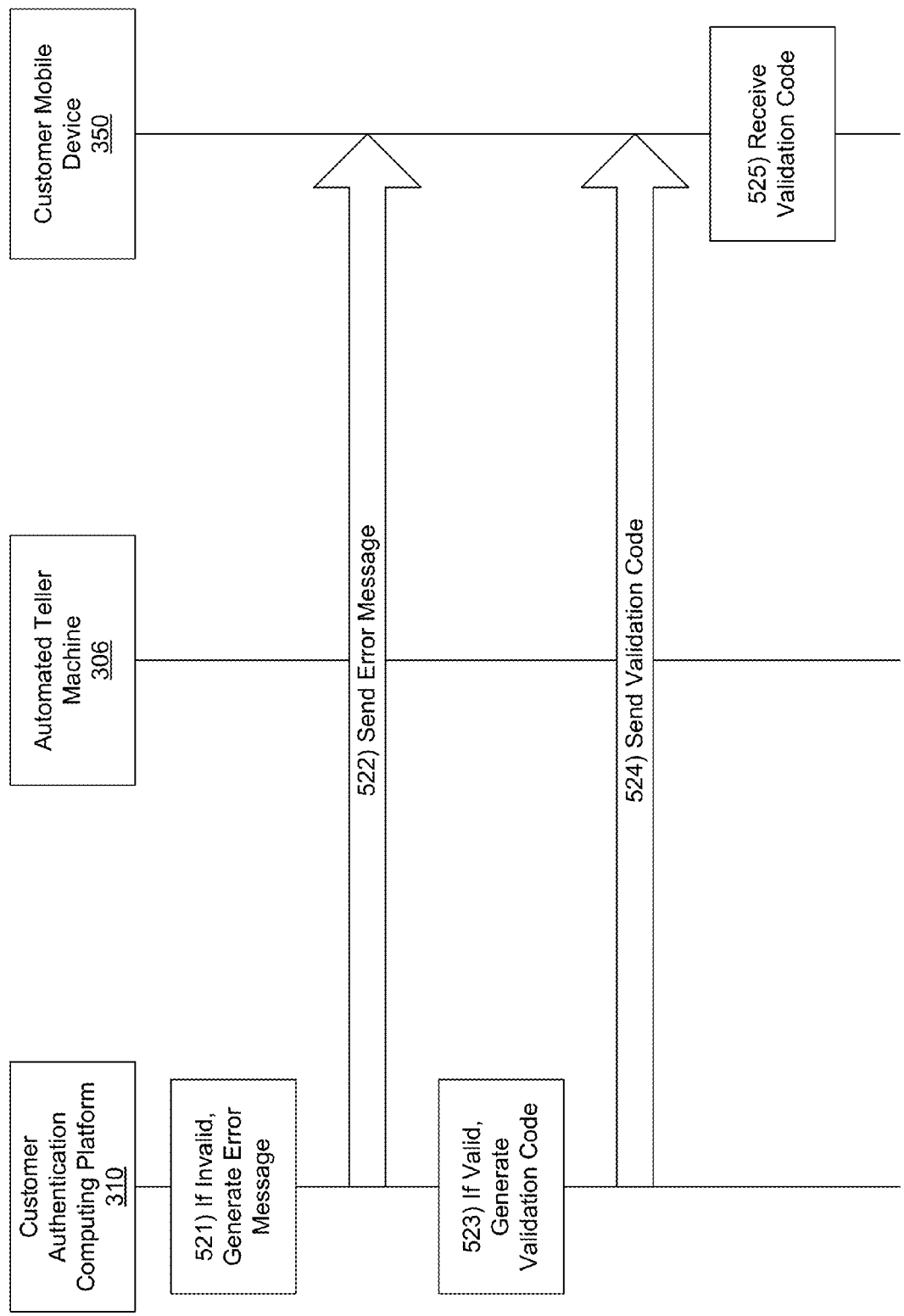

Referring to FIG. 5E, at step 521, if the location information is invalid, customer authentication computing platform 310 may generate an error message, and at step 522, customer authentication computing platform 310 may send the error message to customer mobile device 350. For example, if customer authentication computing platform 310 determines (e.g., at step 520) that the location information identifying the current location of the mobile computing device (e.g., customer mobile device 350, banking center tablet device 340) does not match a predefined location where an automated transaction device is deployed and/or otherwise does not match a predefined location where customer authentication computing platform 310 permits authentication for the mobile computing device, then at step 521, customer authentication computing platform 310 may generate an error message, and at step 522, customer authentication computing platform 310 may send, via communication interface 320, and to the mobile computing device, the error message.

Alternatively, if the location information is valid, customer authentication computing platform 310 may generate a validation code at step 523. For example, if the location information is valid, customer authentication computing platform 310 may generate a validation code that is usable to establish an authentication status of the customer using the mobile computing device (e.g., customer mobile device 350, banking center tablet device 340), as illustrated in greater detail below. In some embodiments, the validation code may be a quick response (QR) code. In other embodiments, the validation code may be a one-time passcode (OTP), such as a unique and/or randomly-generated string of alphanumeric characters.

In some embodiments, the validation code may be usable to establish the authentication status of the customer with the automated transaction device. For example, the validation code (which may, e.g., be generated by customer authentication computing platform 310 and provided to the mobile computing device being used by the customer) may be useable by the customer to authenticate with and/or otherwise gain access to the customer's accounts when interacting with an automated transaction device, such as an automated teller machine or an automated teller assistant, as illustrated in greater detail below.

At step 524, customer authentication computing platform 310 may send the validation code to customer mobile device 350. For example, at step 524, customer authentication computing platform 310 may send, via communication interface 320, and to the mobile computing device (e.g., customer mobile device 350, banking center tablet device 340), the validation code. At step 525, customer mobile device 350 may receive the validation code.

Figure 5F:
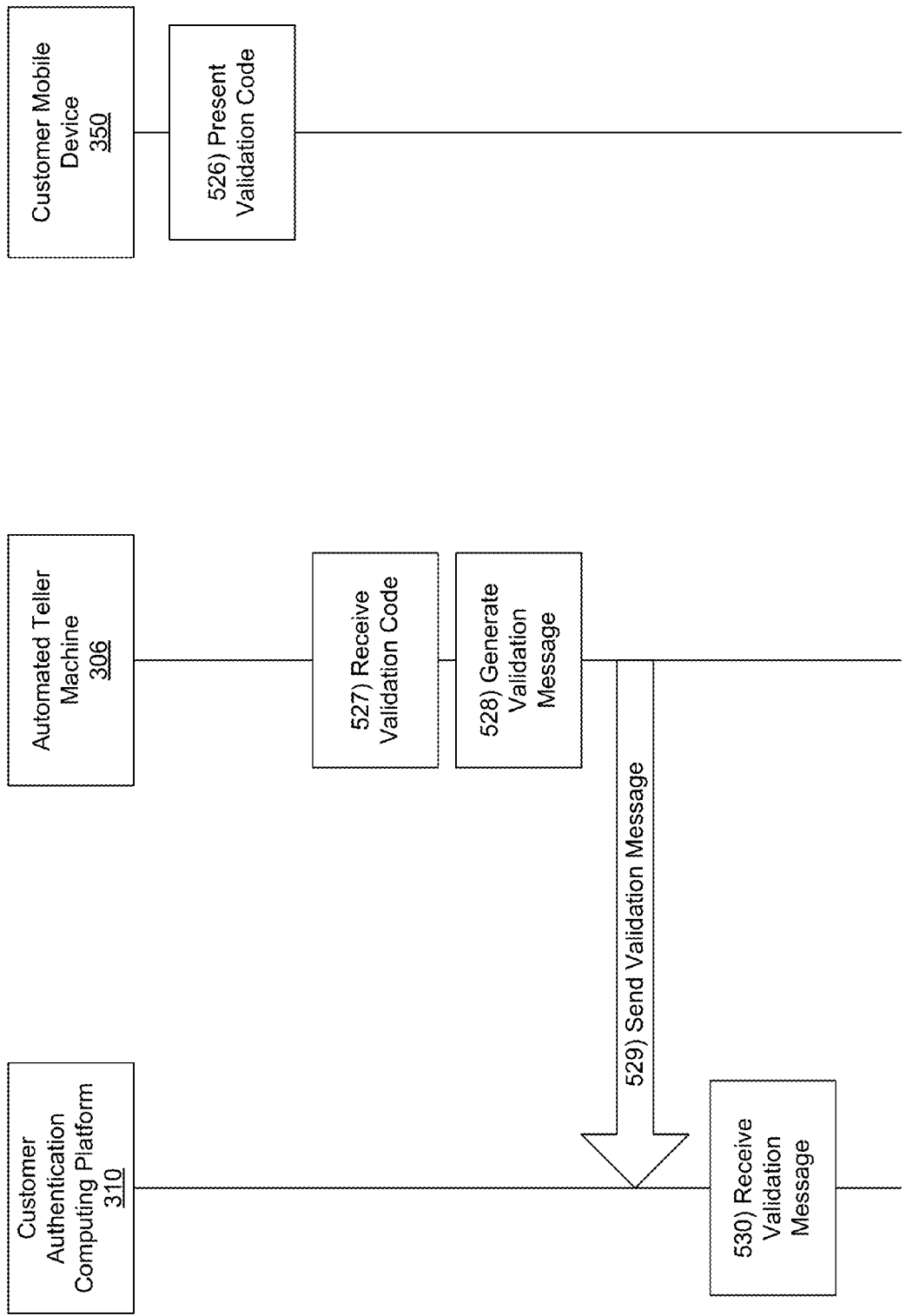
Figure 15:
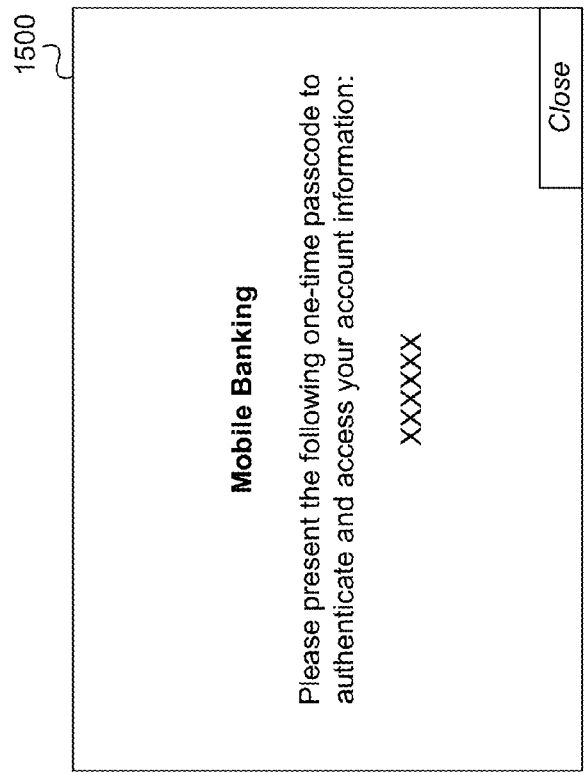
Figure 16:
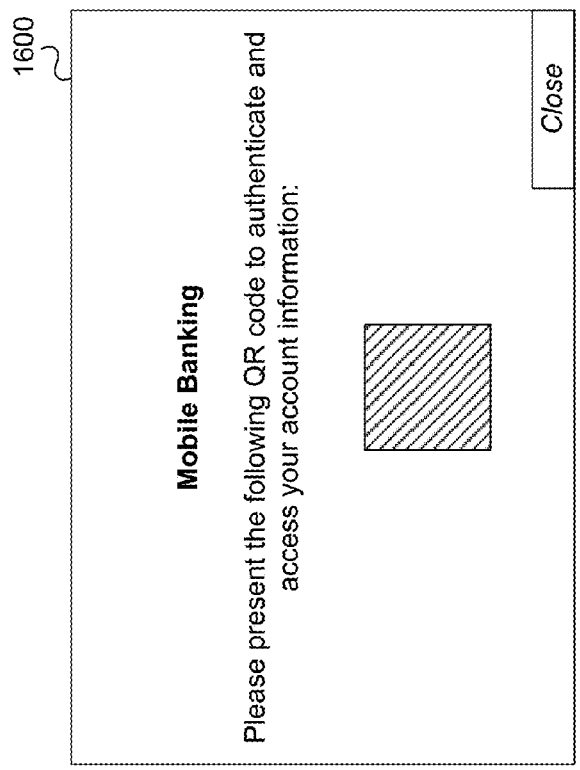

Referring to FIG. 5F, at step 526, customer mobile device 350 may present the validation code. For example, in presenting the validation code at step 526, customer mobile device 350 may display, cause to be displayed, and/or otherwise present a graphical user interface similar to graphical user interface 1500, which is illustrated in FIG. 15, or a graphical user interface similar to graphical user interface 1600, which is illustrated in FIG. 16. As seen in FIG. 15, graphical user interface 1500 may include text and/or other information identifying the validation code (which may, e.g., be a one-time passcode) and/or instructing the user of customer mobile device 350 how to use the validation code to authenticate. As seen in FIG. 16, graphical user interface 1600 may likewise include text and/or other information identifying the validation code (which may, e.g., be a QR code) and/or instructing the user of customer mobile device 350 how to use the validation code to authenticate.

Referring again to FIG. 5F, at step 527, automated teller machine 306 may receive input that includes the validation code. For example, at step 527, automated teller machine 306 may receive input from a user of automated teller machine 306 (who may, e.g., be the customer using the mobile computing device), and such input may include the validation code that was sent to customer mobile device 350.

Figure 17:
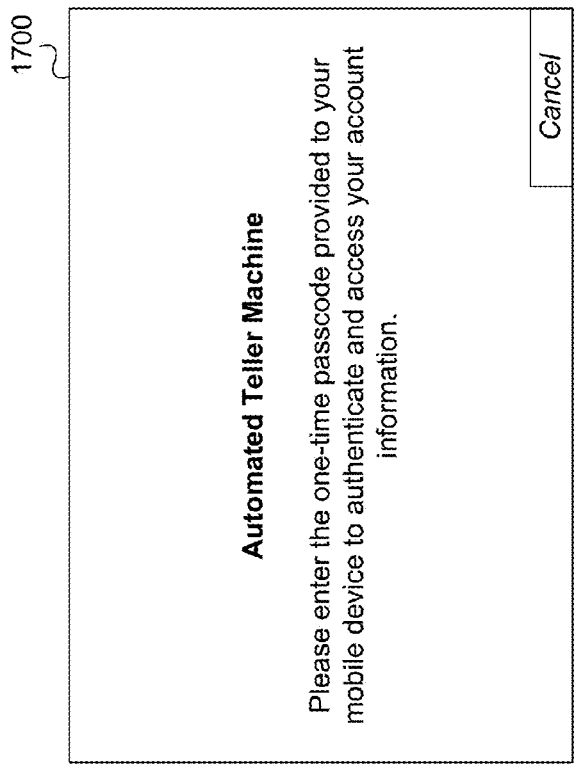
Figure 18:
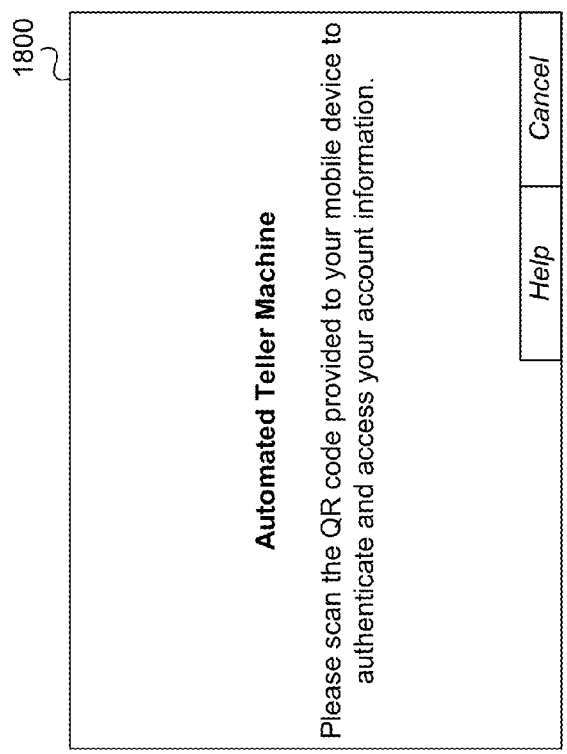

In one or more arrangements, automated teller machine 306 may receive input that includes the validation code as a result of the customer using the mobile computing device (e.g., customer mobile device 350, banking center tablet device 340) presenting the validation code to automated teller machine 306 so as to authenticate with and/or otherwise establish the customer's authentication status with automated teller machine 306. In some instances, when receiving input that includes the validation code, automated teller machine 306 may display, cause to be displayed, and/or otherwise present a graphical user interface similar to graphical user interface 1700, which is illustrated in FIG. 17, or graphical user interface 1800, which is illustrated in FIG. 18. As seen in FIG. 17, graphical user interface 1700 may include text and/or other information instructing the user of automated teller machine 306 to capture, enter, and/or otherwise provide the validation code, such as a one-time passcode, provided to the mobile computing device (e.g., customer mobile device 350, banking center tablet device 340). As seen in FIG. 18, graphical user interface 1800 may include text and/or other information instructing the user of automated teller machine 306 to capture, enter, and/or otherwise provide the validation code, such as a QR code, provided to the mobile computing device (e.g., customer mobile device 350, banking center tablet device 340).

In some instances, rather than automated teller machine 306 receiving the validation code (e.g., at step 527), automated teller assistant 308 may receive the validation code, as the customer using the mobile computing device may be interacting with automated teller assistant 308 instead of automated teller machine 306. In these instances, the sequence of events illustrated in FIGS. 5A-5I may proceed in a similar manner as discussed in the examples herein, except one or more steps may be performed by automated teller assistant 308 instead of being performed by automated teller machine 306.

Referring again to FIG. 5F, at step 528, automated teller machine 306 may generate a validation message. For example, at step 528, automated teller machine 306 may generate a validation message that includes information identifying the validation code received at step 527. At step 529, automated teller machine 306 may send the validation message to customer authentication computing platform 310.

Figure 5G:
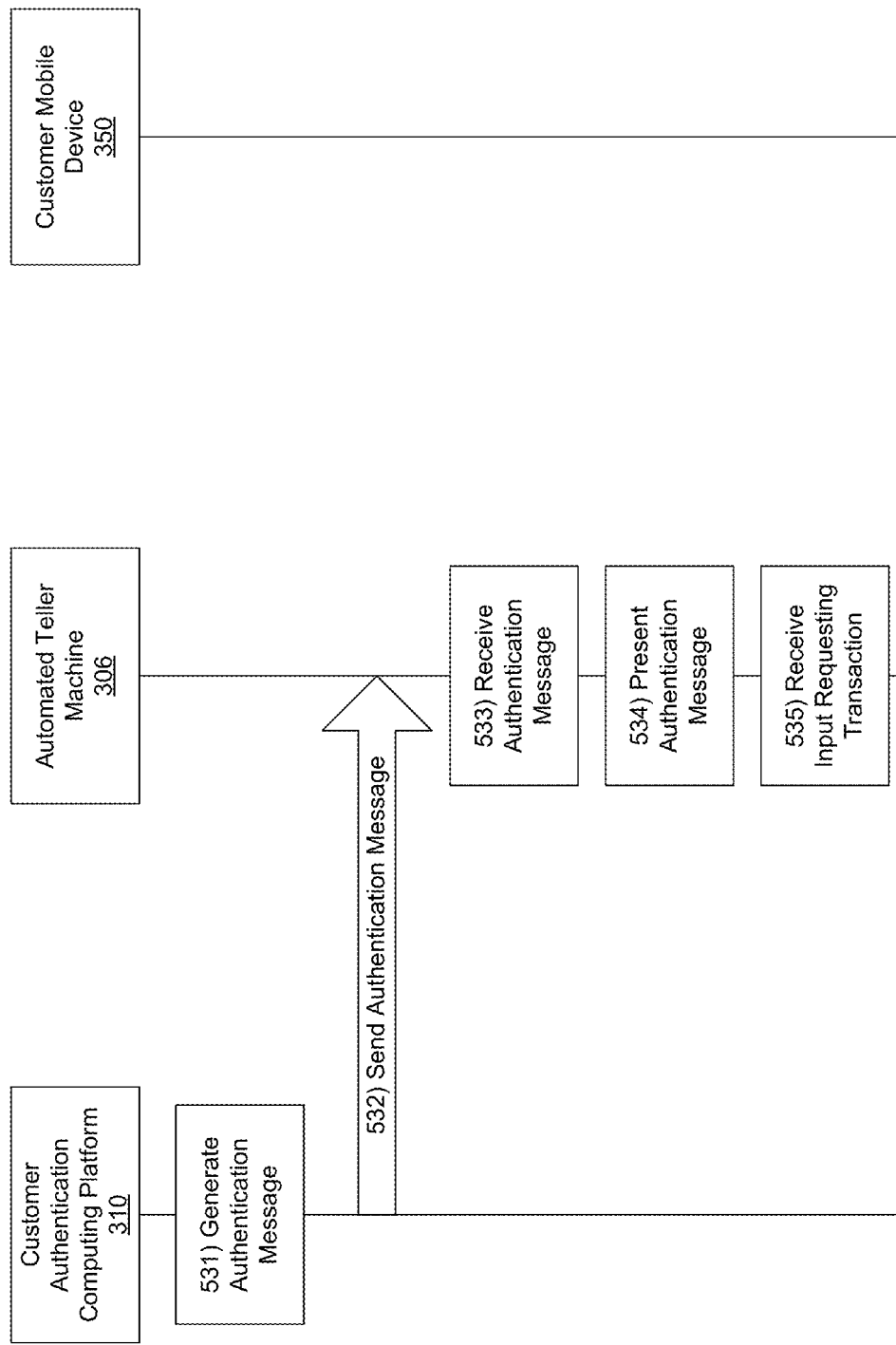

At step 530, customer authentication computing platform 310 may receive the validation message from automated teller machine 306. For example, at step 530, customer authentication computing platform 310 may receive, via communication interface 320, and from an automated transaction device (e.g., automated teller machine 306, automated teller assistant 308), the validation code. Referring to FIG. 5G, at step 531, customer authentication computing platform 310 may generate an authentication message. For example, based on receiving the validation code from the automated transaction device (e.g., automated teller machine 306, automated teller assistant 308), customer authentication computing platform 310 may generate an authentication message indicating that the customer using the mobile computing device (e.g., customer mobile device 350, banking center tablet device 340) is authenticated and/or otherwise authorized to access account information specific to the customer and/or maintained by the organization for the customer. At step 532, customer authentication computing platform 310 may send the authentication message to automated teller machine 306. For example, in response to receiving the validation code (e.g., at step 530), customer authentication computing platform 310 may send, via communication interface 320, and to the automated transaction device (e.g., automated teller machine 306, automated teller assistant 308), a message indicating that the customer using the mobile computing device (e.g., customer mobile device 350, banking center tablet device 340) is authenticated to access account information associated with one or more accounts maintained by the organization for the customer.

Figure 19:
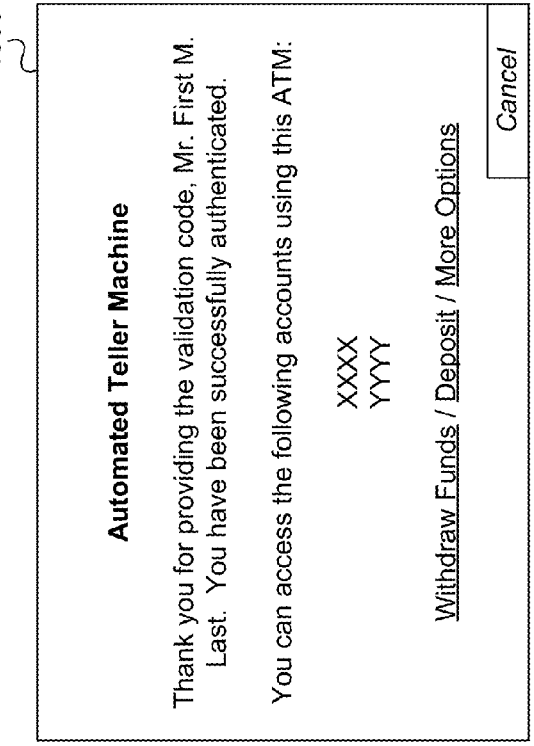

At step 533, automated teller machine 306 may receive the authentication message from customer authentication computing platform 310. At step 534, automated teller machine 306 may present the authentication message. For example, in presenting the authentication message at step 534, automated teller machine 306 may display, cause to be displayed, and/or otherwise present a graphical user interface similar to graphical user interface 1900, which is illustrated in FIG. 19. As seen in FIG. 19, graphical user interface 1900 may include text and/or other information informing the user of automated teller machine 306 that he or she has been authenticated and/or is authorized to access one or more accounts that may be maintained for the customer by the organization operating customer authentication computing platform 310.

At step 535, automated teller machine 306 may receive input requesting a transaction. For example, at step 535, automated teller machine 306 may receive input from the user of automated teller machine 306 requesting a transaction (e.g., a deposit transaction, a withdrawal transaction, a funds transfer transaction, and/or the like) involving one or more accounts that may be maintained for the customer using the mobile computing device (e.g., customer mobile device 350, banking center tablet device 340) by the organization operating customer authentication computing platform 310. Such input may, for instance, be received as a result of the customer requesting the automated transaction device (e.g., automated teller machine 306, automated teller assistant 308) to perform one or more transactions after the customer has been authenticated (e.g., after the authentication message is generated by customer authentication computing platform 310 and/or sent to automated teller machine 306). Additionally or alternatively, such input may be received from the user of automated teller machine 306 via one or more graphical user interfaces presented by automated teller machine 306.

Figure 5H:
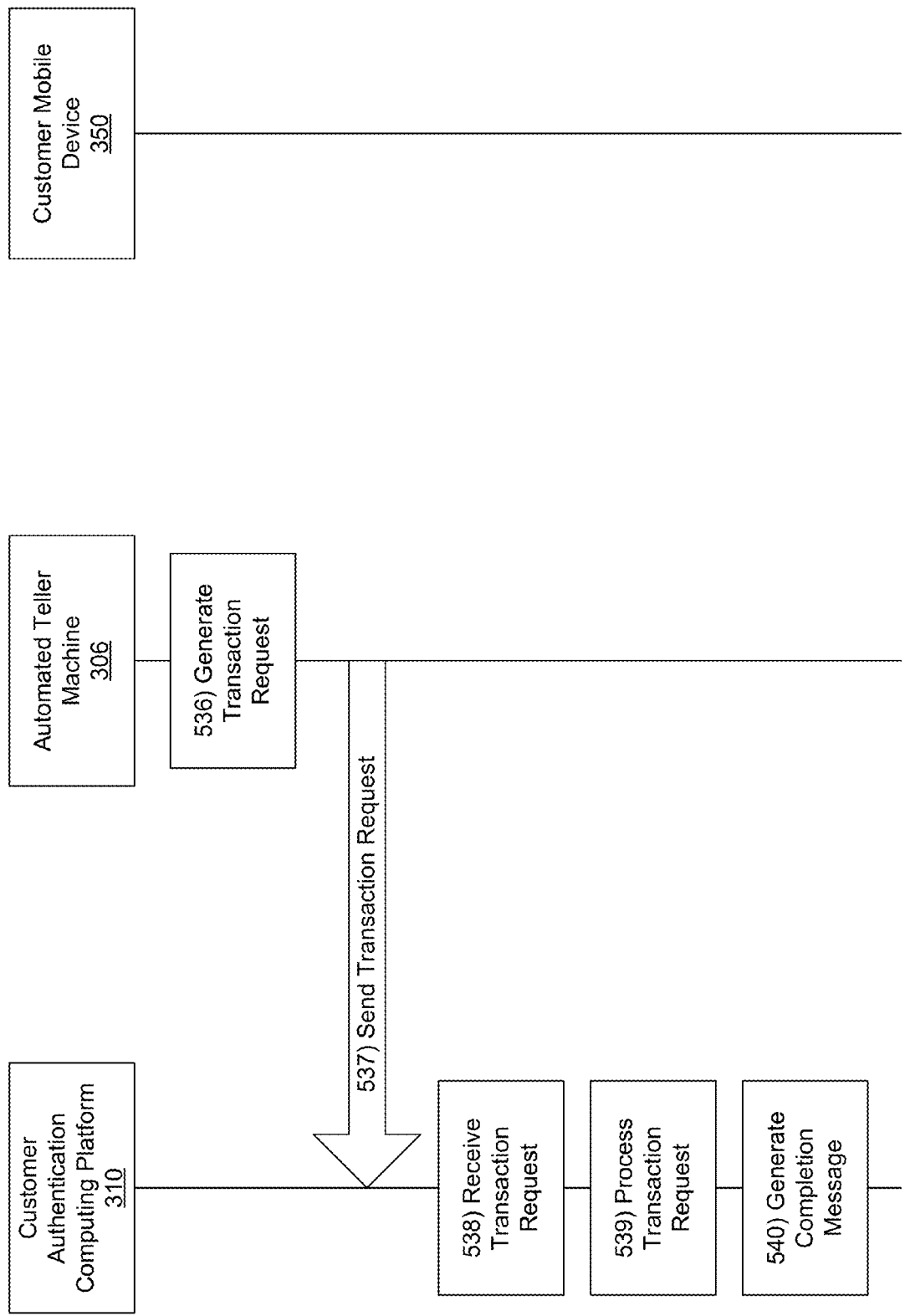

Referring to FIG. 5H, at step 536, automated teller machine 306 may generate a transaction request. For example, at step 536, automated teller machine 306 may generate a transaction request based on the input received at step 535. Such a transaction request may, for instance, include information identifying the type of transaction requested (e.g., deposit, withdrawal, funds transfer), the amount of the transaction, a source account, a target account, and/or other information associated with the transaction. At step 537, automated teller machine 306 may send the transaction request to customer authentication computing platform 310.

At step 538, customer authentication computing platform 310 may receive the transaction request. For example, after receiving the validation code (e.g., at step 527), customer authentication computing platform 310 may receive, via communication interface 320, and from the automated transaction device (e.g., automated teller machine 306, automated teller assistant 308), a transaction request involving at least one account of the one or more accounts maintained by the organization for the customer using the mobile computing device (e.g., customer mobile device 350, banking center tablet device 340).

At step 539, customer authentication computing platform 310 may process the transaction request. For example, at step 539, customer authentication computing platform 310 may process the transaction request involving the at least one account of the one or more accounts maintained by the organization for the customer using the mobile computing device (e.g., customer mobile device 350, banking center tablet device 340). In processing the transaction request, customer authentication computing platform 310 may, for instance, send instructions to and/or otherwise communicate with one or more other computer systems that may be operated by the organization (which may, e.g., be a financial institution) so as to complete the requested transaction. For example, customer authentication computing platform 310 may instruct one or more other computer systems to perform a requested deposit transaction by crediting a particular account, perform a requested withdrawal transaction by debiting a particular account, and/or the like. At step 540, customer authentication computing platform 310 may generate a completion message. For example, after processing the transaction request at step 539, customer authentication computing platform 310 may, at step 540, generate a completion message indicating that the requested transaction has been completed.

Figure 5I:
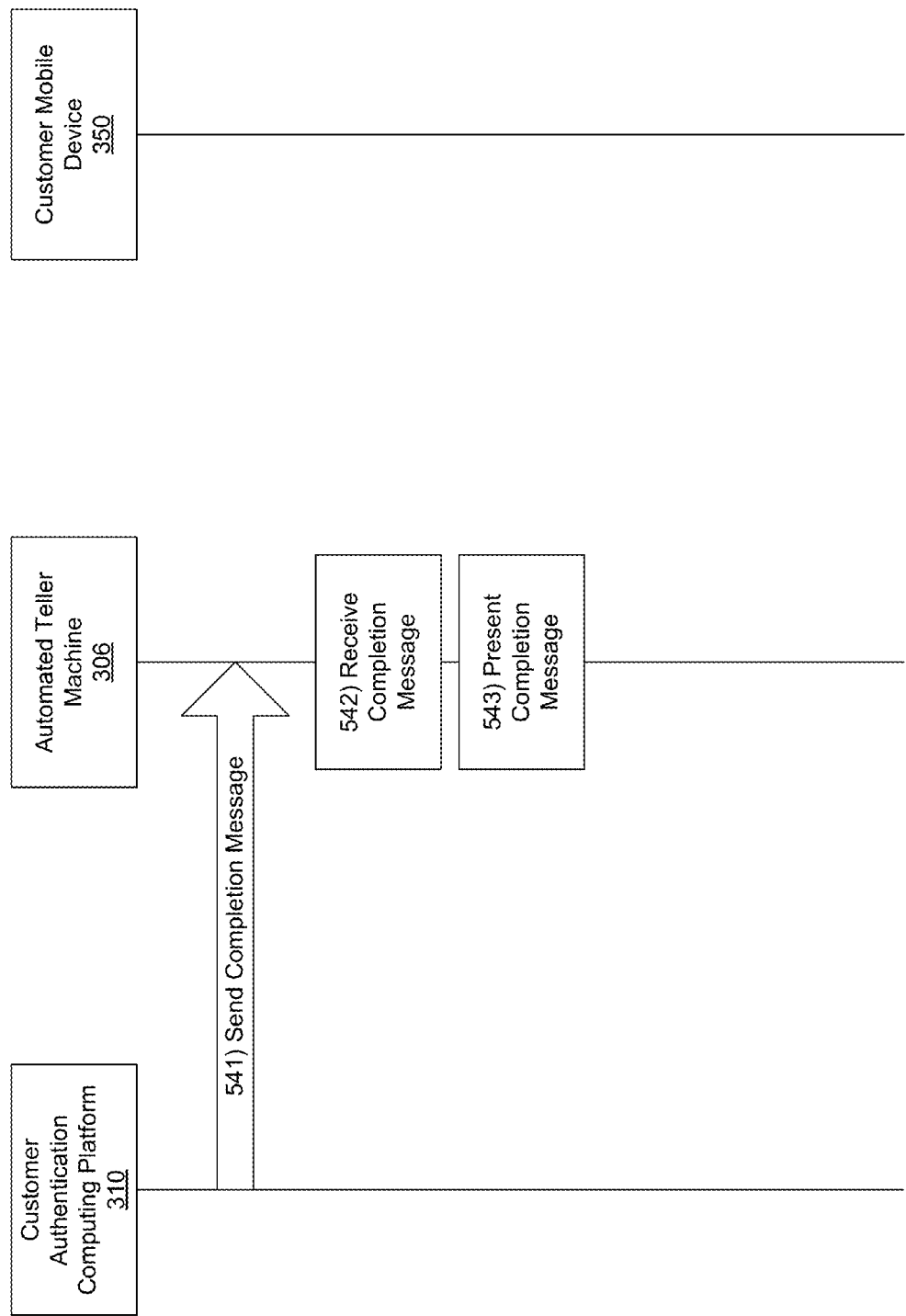

Referring to FIG. 5I, at step 541, customer authentication computing platform 310 may send the completion message to automated teller machine 306. At step 542, automated teller machine 306 may receive the completion message from customer authentication computing platform 310. At step 543, automated teller machine 306 may present the completion message. For example, in presenting the completion message at step 543, automated teller machine 306 may display, cause to be displayed, and/or otherwise present a graphical user interface, which may include text and/or other information indicating that the requested transaction has been completed.

In some embodiments, the automated transaction device (which may, e.g., perform various steps of the event sequence described above, such as those described as being performed by automated teller machine 306) may be an automated teller machine. For example, the automated transaction device may, in some instances, be automated teller machine 306. In other embodiments, the automated transaction device (which may, e.g., perform various steps of the event sequence described above, such as those described as being performed by automated teller machine 306) may be an automated teller assistant. For example, the automated transaction device may, in some instances, be automated teller assistant 308.

In some embodiments, the mobile computing device (which may, e.g., perform various steps of the event sequence described above, such as those described as being performed by customer mobile device 350) may be a banking center tablet device used by a greeter agent of the organization at a banking center where the customer is present. For example, the mobile computing device may, in some instances, be banking center tablet device 340, which may be used by a greeter agent of the organization operating customer authentication computing platform 310 at a banking center where the customer using the mobile computing device is present.

In some embodiments, the mobile computing device (which may, e.g., perform various steps of the event sequence described above, such as those described as being performed by customer mobile device 350) may be a customer mobile device that is used by the customer of the organization at a banking center where the customer is present and that was registered with the organization as belonging to the customer. For example, the mobile computing device may, in some instances, be customer mobile device 350, which may be used by the customer of the organization at a banking center operated by the organization that also operated customer authentication computing platform 310. In addition, customer mobile device 350 may, in some instances, be registered with the organization as belonging to the customer (e.g., during a pre-registration process which may be performed by customer mobile device 350 and/or customer authentication computing platform 310 before step 501 of the event sequence described above).

Figure 20:
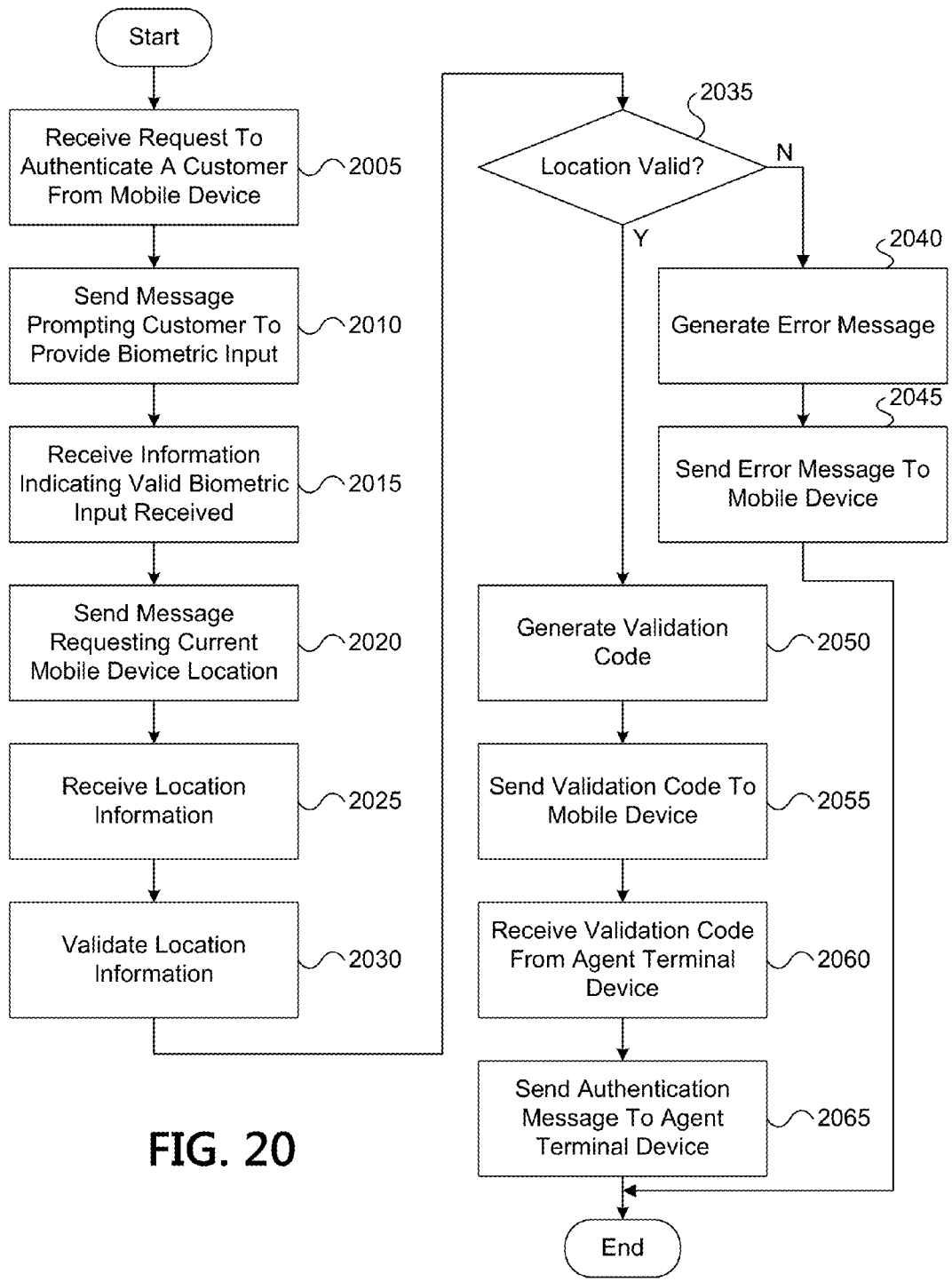
FIG. 20 depicts an illustrative method for authenticating customers and managing authenticated sessions in accordance with one or more example embodiments.

FIG. 20 depicts an illustrative method for authenticating customers and managing authenticated sessions in accordance with one or more example embodiments. Referring to FIG. 20, at step 2005, a computing platform may receive a request from a mobile device to authenticate a customer of an organization. At step 2010, the computing platform may send a message to the mobile device prompting the customer to provide biometric input for validation. At step 2015, the computing platform may receive information from the mobile device indicating that valid biometric input was received from the customer. At step 2020, the computing platform may send a message to the mobile device requesting the current location of the mobile device. At step 2025, the computing platform may receive location information identifying the current location of the mobile device. At step 2030, the computing platform may validate the location information received from the mobile device (e.g., to determine whether the mobile device is located in a location where the customer is able to interact with and/or receive service from an agent of the organization). At step 2035, the computing platform may determine whether the location information was validated (e.g., at step 2030). If the location information is invalid, then at step 2040, the computing platform may generate an error message, and at step 2045, the computing platform may send the error message to the mobile device. Alternatively, if the location information is valid, then at step 2050, the computing platform may generate a validation code, and the validation code may be useable by the customer to establish an authentication status of the customer with an agent of the organization. At step 2055, the computing platform may send the validation code to the mobile device. At step 2060, the computing platform may receive the validation code from an agent terminal device (which may, e.g., be used by an agent of the organization to which the customer provided the validation code so as to establish their authentication status). At step 2065, the computing platform may send an authentication message to the agent terminal device, and the authentication message may indicate that the customer is authenticated and/or authorized to access and/or interact with one or more accounts and/or other information or property that may be maintained by the organization for the customer.

Figure 21:
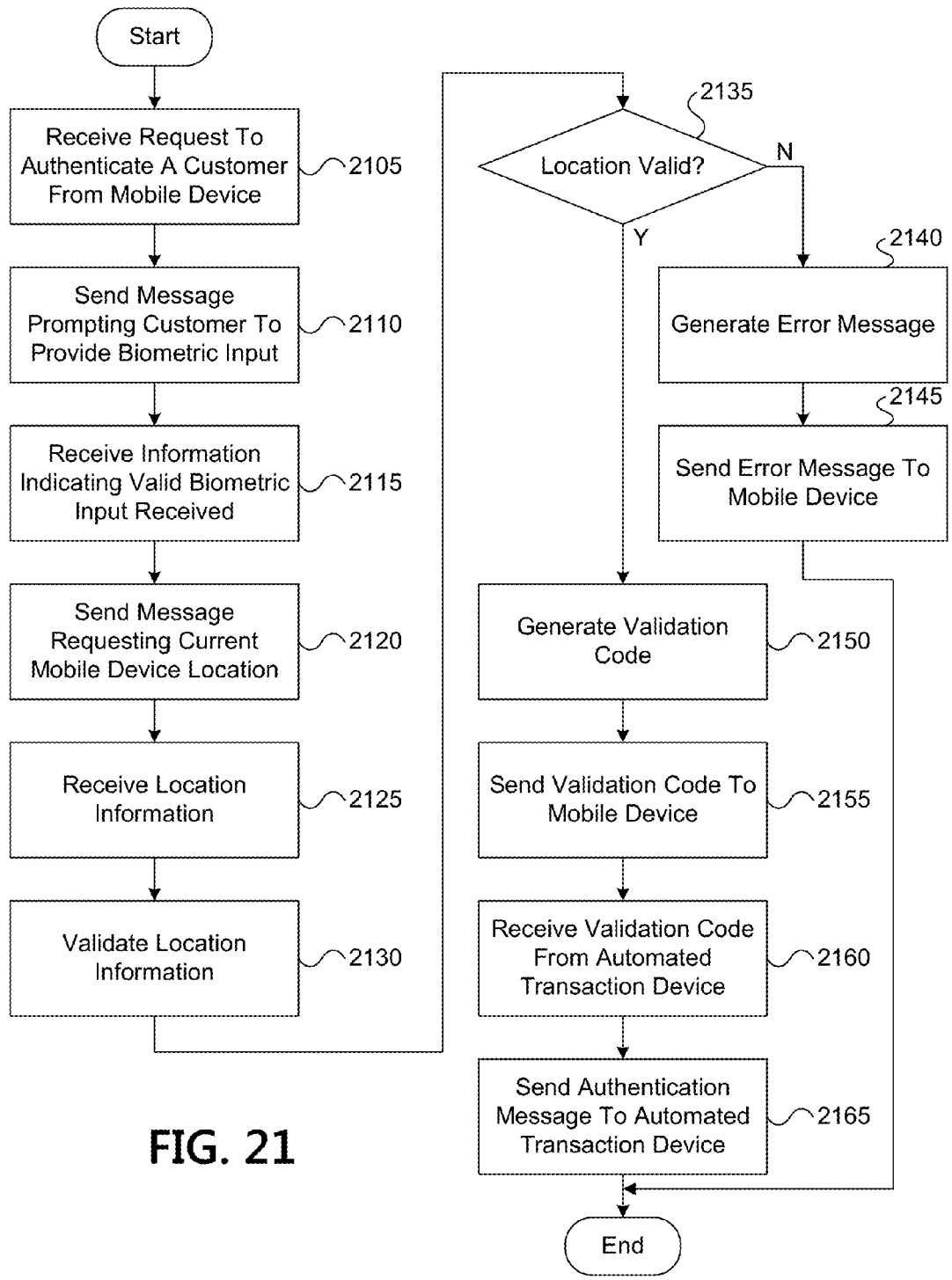
FIG. 21 depicts another illustrative method for authenticating customers and managing authenticated sessions in accordance with one or more example embodiments.

FIG. 21 depicts another illustrative method for authenticating customers and managing authenticated sessions in accordance with one or more example embodiments. Referring to FIG. 21, at step at step 2105, a computing platform may receive a request from a mobile device to authenticate a customer of an organization. At step 2110, the computing platform may send a message to the mobile device prompting the customer to provide biometric input for validation. At step 2115, the computing platform may receive information from the mobile device indicating that valid biometric input was received from the customer. At step 2120, the computing platform may send a message to the mobile device requesting the current location of the mobile device. At step 2125, the computing platform may receive location information identifying the current location of the mobile device. At step 2130, the computing platform may validate the location information received from the mobile device (e.g., to determine whether the mobile device is located in a location where the customer is able to interact with and/or receive service from an automated transaction device associated with the organization, such as an automated teller machine or an automated teller assistant operated by the organization). At step 2135, the computing platform may determine whether the location information was validated (e.g., at step 2130). If the location information is invalid, then at step 2140, the computing platform may generate an error message, and at step 2145, the computing platform may send the error message to the mobile device. Alternatively, if the location information is valid, then at step 2150, the computing platform may generate a validation code, and the validation code may be useable by the customer to establish an authentication status of the customer with an automated transaction device. At step 2155, the computing platform may send the validation code to the mobile device. At step 2160, the computing platform may receive the validation code from an automated transaction device (which may, e.g., be being used by the customer and which may receive the validation code from the customer when the customer requests to authenticate with the automated transaction device). At step 2165, the computing platform may send an authentication message to the automated transaction device, and the authentication message may indicate that the customer is authenticated and/or authorized to access and/or interact with one or more accounts and/or other information or property that may be maintained by the organization for the customer and that may be accessible via the automated transaction device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, and from a mobile computing device, a request to authenticate a customer of an organization;
   based on receiving the request to authenticate the customer of the organization, send, via the communication interface, and to the mobile computing device, a first message configured to cause the mobile computing device to prompt the customer of the organization to provide biometric authentication input for validation by the mobile computing device;
   after sending the first message configured to cause the mobile computing device to prompt the customer of the organization to provide the biometric authentication input for validation by the mobile computing device, receive, via the communication interface, and from the mobile computing device, information indicating that the mobile computing device received valid biometric authentication input from the customer;
   in response to receiving the information indicating that the mobile computing device received the valid biometric authentication input from the customer, send, via the communication interface, and to the mobile computing device, a second message configured to cause the mobile computing device to provide information identifying a current location of the mobile computing device;
   after sending the second message configured to cause the mobile computing device to provide the information identifying the current location of the mobile computing device, receive, via the communication interface, and from the mobile computing device, location information identifying the current location of the mobile computing device;
   based on receiving the location information identifying the current location of the mobile computing device, validate the location information identifying the current location of the mobile computing device;
   if the location information is valid, generate a validation code that is usable to establish an authentication status of the customer;
   based on generating the validation code that is usable to establish the authentication status of the customer, send, via the communication interface, and to the mobile computing device, the validation code;
   after sending the validation code to the mobile computing device, receive, via the communication interface, and from an agent terminal device, the validation code; and
   in response to receiving the validation code, send, via the communication interface, and to the agent terminal device, a message indicating that the customer is authenticated to access account information associated with one or more accounts maintained by the organization for the customer.

2. The system of claim 1, wherein validating the location information identifying the current location of the mobile computing device comprises comparing the location information identifying the current location of the mobile computing device with location validation information defining one or more retail locations of the organization.

3. The system of claim 1, wherein the memory stores additional computer-readable instructions that, when executed by the at least one processor, cause the system to:
   if the location information is invalid, generate an error message; and
   send, via the communication interface, and to the mobile computing device, the error message.

4. The system of claim 1, wherein the mobile computing device is a banking center tablet device used by a greeter agent of the organization at a banking center where the customer is present.

5. The system of claim 1, wherein the mobile computing device is a customer mobile device that is used by the customer of the organization at a banking center where the customer is present and that was registered with the organization as belonging to the customer.

6. The system of claim 1, wherein the validation code is a quick response (QR) code.

7. The system of claim 1, wherein the agent terminal device is a video teller terminal device used by a video teller agent of the organization at a call center located remotely from a banking center where the customer is present.

8. The system of claim 7, wherein the validation code is usable to establish the authentication status of the customer with the video teller agent of the organization.

9. The system of claim 1, wherein the agent terminal device is a banking center teller terminal device used by a teller of the organization at a banking center where the customer is present.

10. The system of claim 9, wherein the validation code is usable to establish the authentication status of the customer with the teller of the organization at the banking center where the customer is present.

11. The system of claim 1, wherein the memory stores additional computer-readable instructions that, when executed by the at least one processor, cause the system to:
  after receiving the validation code, receive, via the communication interface, and from the agent terminal device, a transaction request involving at least one account of the one or more accounts maintained by the organization for the customer; and
  process the transaction request involving the at least one account of the one or more accounts maintained by the organization for the customer.

12. The system of claim 1, wherein the location information identifying the current location of the mobile computing device comprises one or more geographic coordinates determined by the mobile computing device.

13. The system of claim 1, wherein the location information identifying the current location of the mobile computing device comprises beacon information obtained from a localized beacon signal received by the mobile computing device.

14. A method, comprising:
  at a computing platform comprising at least one processor, memory, and a communication interface:
    receiving, by the at least one processor, via the communication interface, and from a mobile computing device, a request to authenticate a customer of an organization;
    based on receiving the request to authenticate the customer of the organization, sending, by the at least one processor, via the communication interface, and to the mobile computing device, a first message configured to cause the mobile computing device to prompt the customer of the organization to provide biometric authentication input for validation by the mobile computing device;
    after sending the first message configured to cause the mobile computing device to prompt the customer of the organization to provide the biometric authentication input for validation by the mobile computing device, receiving, by the at least one processor, via the communication interface, and from the mobile computing device, information indicating that the mobile computing device received valid biometric authentication input from the customer;
    in response to receiving the information indicating that the mobile computing device received the valid biometric authentication input from the customer, sending, by the at least one processor, via the communication interface, and to the mobile computing device, a second message configured to cause the mobile computing device to provide information identifying a current location of the mobile computing device;
    after sending the second message configured to cause the mobile computing device to provide the information identifying the current location of the mobile computing device, receiving, by the at least one processor, via the communication interface, and from the mobile computing device, location information identifying the current location of the mobile computing device;
    based on receiving the location information identifying the current location of the mobile computing device, validating, by the at least one processor, the location information identifying the current location of the mobile computing device;
    if the location information is valid, generating, by the at least one processor, a validation code that is usable to establish an authentication status of the customer;
    based on generating the validation code that is usable to establish the authentication status of the customer, sending, by the at least one processor, via the communication interface, and to the mobile computing device, the validation code;
    after sending the validation code to the mobile computing device, receiving, by the at least one processor, via the communication interface, and from an agent terminal device, the validation code; and
    in response to receiving the validation code, sending, by the at least one processor, via the communication interface, and to the agent terminal device, a message indicating that the customer is authenticated to access account information associated with one or more accounts maintained by the organization for the customer.

15. The method of claim 14, comprising:
  if the location information is invalid, generating, by the at least one processor, an error message; and
  sending, by the at least one processor, via the communication interface, and to the mobile computing device, the error message.

16. The method of claim 14, wherein the mobile computing device is a banking center tablet device used by a greeter agent of the organization at a banking center where the customer is present.

17. The method of claim 14, wherein the mobile computing device is a customer mobile device that is used by the customer of the organization at a banking center where the customer is present and that was registered with the organization as belonging to the customer.

18. The method of claim 14,
  wherein the agent terminal device is a video teller terminal device used by a video teller agent of the organization at a call center located remotely from a banking center where the customer is present, and
  wherein the validation code is usable to establish the authentication status of the customer with the video teller agent of the organization.

19. The method of claim 14,
  wherein the agent terminal device is a banking center teller terminal device used by a teller of the organization at a banking center where the customer is present, and
  wherein the validation code is usable to establish the authentication status of the customer with the teller of the organization at the banking center where the customer is present.

20. One or more non-transitory computer-readable media storing instructions that, when executed by a computing platform comprising at least one processor, memory, and a communication interface, cause the computing platform to:
  receive, via the communication interface, and from a mobile computing device, a request to authenticate a customer of an organization;

based on receiving the request to authenticate the customer of the organization, send, via the communication interface, and to the mobile computing device, a first message configured to cause the mobile computing device to prompt the customer of the organization to provide biometric authentication input for validation by the mobile computing device;

after sending the first message configured to cause the mobile computing device to prompt the customer of the organization to provide the biometric authentication input for validation by the mobile computing device, receive, via the communication interface, and from the mobile computing device, information indicating that the mobile computing device received valid biometric authentication input from the customer;

in response to receiving the information indicating that the mobile computing device received the valid biometric authentication input from the customer, send, via the communication interface, and to the mobile computing device, a second message configured to cause the mobile computing device to provide information identifying a current location of the mobile computing device;

after sending the second message configured to cause the mobile computing device to provide the information identifying the current location of the mobile computing device, receive, via the communication interface, and from the mobile computing device, location information identifying the current location of the mobile computing device;

based on receiving the location information identifying the current location of the mobile computing device, validate the location information identifying the current location of the mobile computing device;

if the location information is valid, generate a validation code that is usable to establish an authentication status of the customer;

based on generating the validation code that is usable to establish the authentication status of the customer, send, via the communication interface, and to the mobile computing device, the validation code;

after sending the validation code to the mobile computing device, receive, via the communication interface, and from an agent terminal device, the validation code; and in response to receiving the validation code, send, via the communication interface, and to the agent terminal device, a message indicating that the customer is authenticated to access account information associated with one or more accounts maintained by the organization for the customer.

21. The system of claim 1,
wherein the agent terminal device comprises one of:
a video teller terminal device used by a video teller agent of the organization at a call center located remotely from a banking center where the customer is present, wherein the validation code is usable to establish the authentication status of the customer with the video teller agent of the organization; or
a banking center teller terminal device used by a teller of the organization at the banking center where the customer is present, wherein the validation code is usable to establish the authentication status of the customer with the teller of the organization at the banking center where the customer is present.

\* \* \* \* \*